United States Patent
Goto

(10) Patent No.: US 10,015,830 B2
(45) Date of Patent: Jul. 3, 2018

(54) COMMUNICATION APPARATUS AND COMMUNICATION PARAMETER CONFIGURATION METHOD THEREOF

(71) Applicant: CANON KABUSHIKI KAISHA, Tokyo (JP)

(72) Inventor: Fumihide Goto, Naka-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/290,536

(22) Filed: Oct. 11, 2016

(65) Prior Publication Data

US 2017/0034861 A1 Feb. 2, 2017

Related U.S. Application Data

(63) Continuation of application No. 14/109,719, filed on Dec. 17, 2013, now Pat. No. 9,544,929, which is a (Continued)

(30) Foreign Application Priority Data

Jun. 13, 2005 (JP) .................. 2005-172968

(51) Int. Cl.
*H04L 12/28* (2006.01)
*H04W 76/02* (2009.01)
(Continued)

(52) U.S. Cl.
CPC ......... *H04W 76/023* (2013.01); *H04L 9/0869* (2013.01); *H04L 41/0803* (2013.01);
(Continued)

(58) Field of Classification Search
CPC ............ H04L 63/0428; H04L 63/1466; H04L 9/0869; H04L 41/0803; H04W 12/12; H04W 76/023; H04W 12/04; H04W 84/12

See application file for complete search history.

(56) References Cited

U.S. PATENT DOCUMENTS 6,018,581 A 1/2000 Shona
7,072,354 B1 7/2006 Beathard
(Continued)

FOREIGN PATENT DOCUMENTS

JP 9-238132 9/1997
JP 11-146030 5/1999
(Continued)

*Primary Examiner* — Ayaz Sheikh
*Assistant Examiner* — Hai-Chang Hsiung
(74) *Attorney, Agent, or Firm* — Fitzpatrick, Cella, Harper & Scinto

(57) ABSTRACT

A communication apparatus functioning as a master device denies participation by new communication apparatuses in a network in communication parameter configuration mode based on participation statuses of communication apparatuses functioning as slave devices in the network. The communication apparatus functioning as a master device establishes the network in communication parameter configuration mode between the communication apparatuses participating in the network, and configures communication parameters.

10 Claims, 19 Drawing Sheets

Related U.S. Application Data continuation of application No. 11/911,718, filed as application No. PCT/JP2006/310833 on May 24, 2006, now Pat. No. 8,638,689.

(51) Int. Cl.
| | |
|---|---|
| *H04L 29/06* | (2006.01) |
| *H04W 12/12* | (2009.01) |
| *H04W 12/04* | (2009.01) |
| *H04L 9/08* | (2006.01) |
| *H04L 12/24* | (2006.01) |
| *H04W 76/14* | (2018.01) |
| *H04W 84/12* | (2009.01) |

(52) U.S. Cl.
CPC ...... *H04L 63/0428* (2013.01); *H04L 63/1466* (2013.01); *H04W 12/04* (2013.01); *H04W 12/12* (2013.01); *H04W 76/14* (2018.02); *H04W 84/12* (2013.01)

(56) References Cited

U.S. PATENT DOCUMENTS

| | | | |
|---|---|---|---|
| 7,555,264 B2 | 6/2009 | Ishiwata | |
| 8,447,040 B2* | 5/2013 | Goto | H04L 9/0816 380/279 |
| 8,638,689 B2* | 1/2014 | Goto | H04L 63/0428 370/254 |
| 9,301,328 B2* | 3/2016 | Goto | H04L 63/0428 |
| 2002/0019725 A1* | 2/2002 | Petite | G05B 23/0208 702/188 |
| 2002/0063621 A1* | 5/2002 | Tseng | H01R 13/20 340/2.7 |
| 2003/0002482 A1* | 1/2003 | Kubler | G06F 1/1626 370/352 |
| 2003/0018735 A1 | 1/2003 | Fujii | |
| 2003/0037283 A1 | 2/2003 | Srinivassan | |
| 2003/0100335 A1 | 5/2003 | Gassho | |
| 2003/0119484 A1* | 6/2003 | Adachi | H04L 63/04 455/411 |
| 2003/0210788 A1 | 11/2003 | Billhartz | |
| 2005/0014467 A1 | 1/2005 | Ishiwata | |
| 2005/0182942 A1 | 8/2005 | Calin | |
| 2005/0201342 A1 | 9/2005 | Wilkinson | |
| 2006/0036856 A1* | 2/2006 | Kok | H04L 63/0823 713/168 |
| 2006/0039336 A1 | 2/2006 | Ishimura | |
| 2006/0190726 A1 | 8/2006 | Brique | |
| 2006/0200678 A1* | 9/2006 | Yamada | H04L 9/0833 713/182 |

FOREIGN PATENT DOCUMENTS

| | | |
|---|---|---|
| JP | 2001-313723 | 11/2001 |
| JP | 2001-326658 | 11/2001 |
| JP | 2003-163668 | 6/2003 |
| JP | 2003-259444 | 9/2003 |
| JP | 2003-318922 | 11/2003 |
| JP | 2003-338821 | 11/2003 |
| JP | 2004-32664 | 1/2004 |
| JP | 2004-158954 | 6/2004 |
| JP | 2004-159050 | 6/2004 |
| JP | 2004-328288 | 11/2004 |
| JP | 2004-328289 | 11/2004 |
| JP | 2005-27280 | 1/2005 |
| JP | 2005-80158 | 3/2005 |

* cited by examiner

COMMUNICATION APPARATUS AND COMMUNICATION PARAMETER CONFIGURATION METHOD THEREOF

This application is a continuation of application Ser. No. 14/109,719, filed Dec. 17, 2013 (allowed), which is a continuation of application Ser. No. 11/911,718, filed Oct. 16, 2007 (now U.S. Pat. No. 8,638,689, issued on Jan. 28, 2014), which is a § 371 of International Application No. PCT/JP2006/310833, filed May 24, 2006, which claims priority to Japanese Application No. JP 2005-172968, filed Jun. 13, 2005, the contents of each of which are incorporated by reference herein.

TECHNICAL FIELD

The present invention relates to a communication apparatus and a communication parameter configuration method thereof.

BACKGROUND ART

In network devices, cables have been conventionally used as communication media. Recently, however, the use of wireless communication has become popular.

For instance, with IEEE 802.11x compliant wireless LANs, there are many configuration items that must be configured prior to use, making such wireless LANs cumbersome and complicated. Consequently, various manufacturers have proposed mechanisms enabling easy configuration of wireless communication parameters such as SSIDs (Service Set Identifiers) or encryption methods.

For example, one such mechanism is disclosed in U.S Patent Application Publication No. 2003-100335 (Japanese Patent Laid-Open No. 2003-163668). This document proposes a mechanism for configuring wireless communication parameters using an ad hoc network wherein wireless communication devices communicate directly with each other in a wireless LAN without accessing an access point (base station).

When configuring wireless communication parameters using wireless communication, such configuration essentially requires strengthening countermeasure against spoofing by third parties who do not need to know such configuration information or third parties with malicious intent.

DISCLOSURE OF INVENTION

The present invention has been made in light of the above problems, and an object of the present invention is to strengthen responses against spoofing by third parties by imposing certain restrictions when establishing a communication parameter configuration network. Another object of the present invention is to reduce transmission of communication parameters to unnecessary devices. Other objects and features of the present invention will become apparent through the following description and the accompanying drawings.

The present invention comprises: a denial step of denying participation of new communication apparatuses in a network in communication parameter configuration mode, based on participation statuses of communication apparatuses to participate in the network; and a communication parameter configuration step of establishing the network in communication parameter configuration mode between communication apparatuses participating in the network to configure communication parameters.

In addition, the present invention comprises: a denial step of denying participation of new communication apparatuses in a network in communication parameter configuration mode, based on the capability information of communication apparatuses to participate in the network; and a communication parameter configuration step of establishing the network in communication parameter configuration mode between communication apparatuses participating in the network to configure communication parameters.

Other features and advantages of the present invention will be apparent from the following description taken in conjunction with the accompanying drawings, in which like reference characters designate the same or similar parts throughout the figures thereof.

BEST MODE FOR CARRYING OUT THE INVENTION

A detailed description of the preferred embodiments for implementing the present invention will now be provided with reference to the drawings.

First Embodiment

First, a case where an ad hoc mode communication parameter configuration network in an IEEE802.11 compliant wireless LAN is established between two wireless communication devices will be described.

Figure 1:
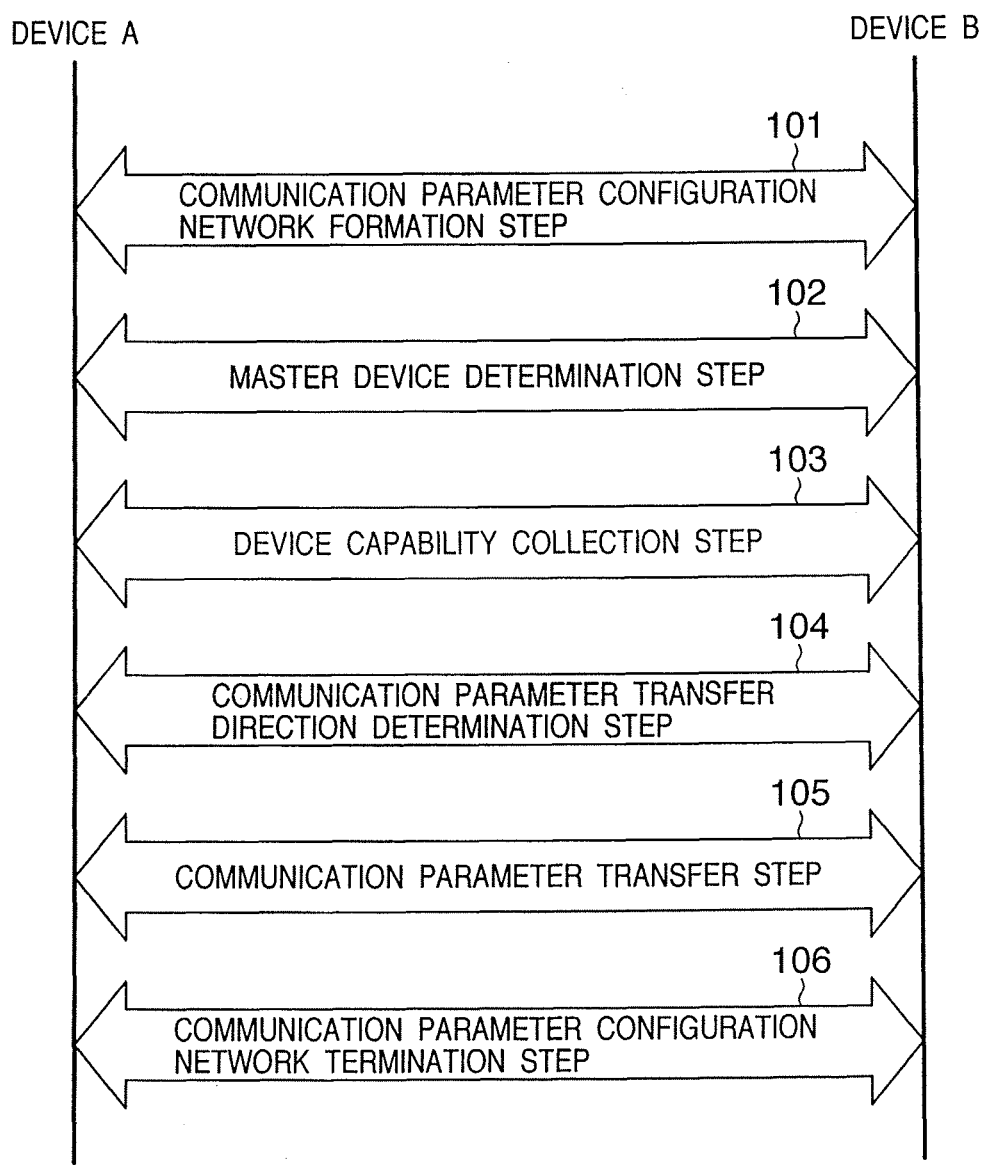
FIG. 1 is a diagram showing a step of establishing a communication parameter configuration network in an ad hoc network.

FIG. 1 shows the steps for configuring communication parameters in ad hoc mode. The steps of FIG. 1 comprise six steps with respectively different purposes. The functions of each step will now be briefly described.

<Communication Parameter Configuration Network Formation Step 101>

In this step, processing is performed for forming a communication parameter configuration network between devices A and B using ad hoc connection.

<Master Device Determination Step 102>

In this step, processing is performed for determining which of the devices A and B will become a master device of the communication parameter configuration network and which of the devices will become a slave device. In addition, each device will continuously perform processing for monitoring whether the other device exists on the same network. The master device collects capability information of slave devices existing on the same network, and determines which device will transfer and which device will receive a communication parameter. In addition, the master device performs processing such as for transmitting information necessary for communication parameter transfer, to the devices that have been determined. The slave device transmits its own device capability in response to a device capability transmission request transmitted from the master device. In addition, the slave device performs processing such as for configuring communication parameters, according to instructions from the master device, with devices indicated in the instructions.

<Device Capability Collection Step 103>

In this step, the master device determined in step 102 performs processing for collecting device capability attribute values owned by the slave devices existing on the same network by making inquiries to the slave devices.

<Communication Parameter Transfer Direction Determination Step 104>

In this step, the master device compares its own device capability attribute values with those of each slave device collected by the master device in step 103. The master device determines which device will be the source of communication parameter transfer and which device will be its destination, and also transfers information necessary for communication parameter transfer, such as destination or source information, to each slave device.

<Communication Parameter Transfer Step 105>

In this step, communication parameters are transferred from a device that is actually capable of providing communication parameters to a device that is actually capable of receiving communication parameters in the communication parameter transfer direction determined in step 104.

<Communication Parameter Configuration Network Termination Step 106>

In this step, prompted by the termination of the transfer of step 105, processing necessary to terminate the communication parameter configuration network will be performed. After the conclusion of the communication parameter configuration network termination step 106, a new network will be established using communication parameters transferred in the communication parameter transfer step 105.

By performing the above six steps, communication parameters can be easily configured in ad hoc wireless communication.

The processing described below is the processing starting at the communication parameter configuration network formation step 101 and ending at the master device determination step 102, as shown in FIG. 1.

Figure 2:
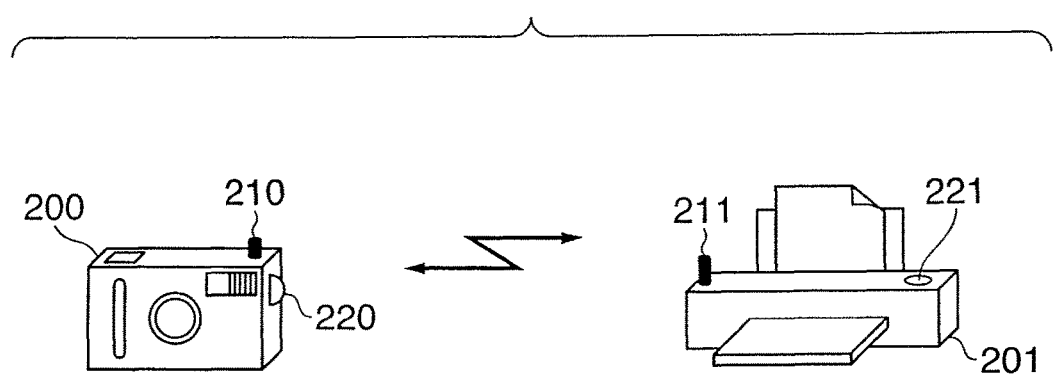
FIG. 2 is a diagram showing an example of a configuration of an ad hoc network of two wireless communication devices.

FIG. 2 is a diagram showing an example of a configuration of an ad hoc network of two wireless communication devices. In FIG. 2, a wireless communication device A is a digital camera 200 having an IEEE 802.11x compliant wireless LAN as its wireless communication function 210, and becomes capable of establishing a network in communication parameter configuration mode when a communication parameter configuration button 220 is pressed. In addition, a wireless communication device B is a printer 201 having an IEEE 802.11x compliant wireless LAN as its wireless communication function 211, and becomes capable of establishing a network in communication parameter configuration mode when a communication parameter configuration button 221 is pressed.

Ad hoc mode wireless communication parameter configuration is performed between the digital camera 200 (device A) and the printer 201 (device B).

The configurations of the digital camera 200 (device A) and the printer 201 (device B) will now be described using FIGS. 3 and 4.

Figure 3:
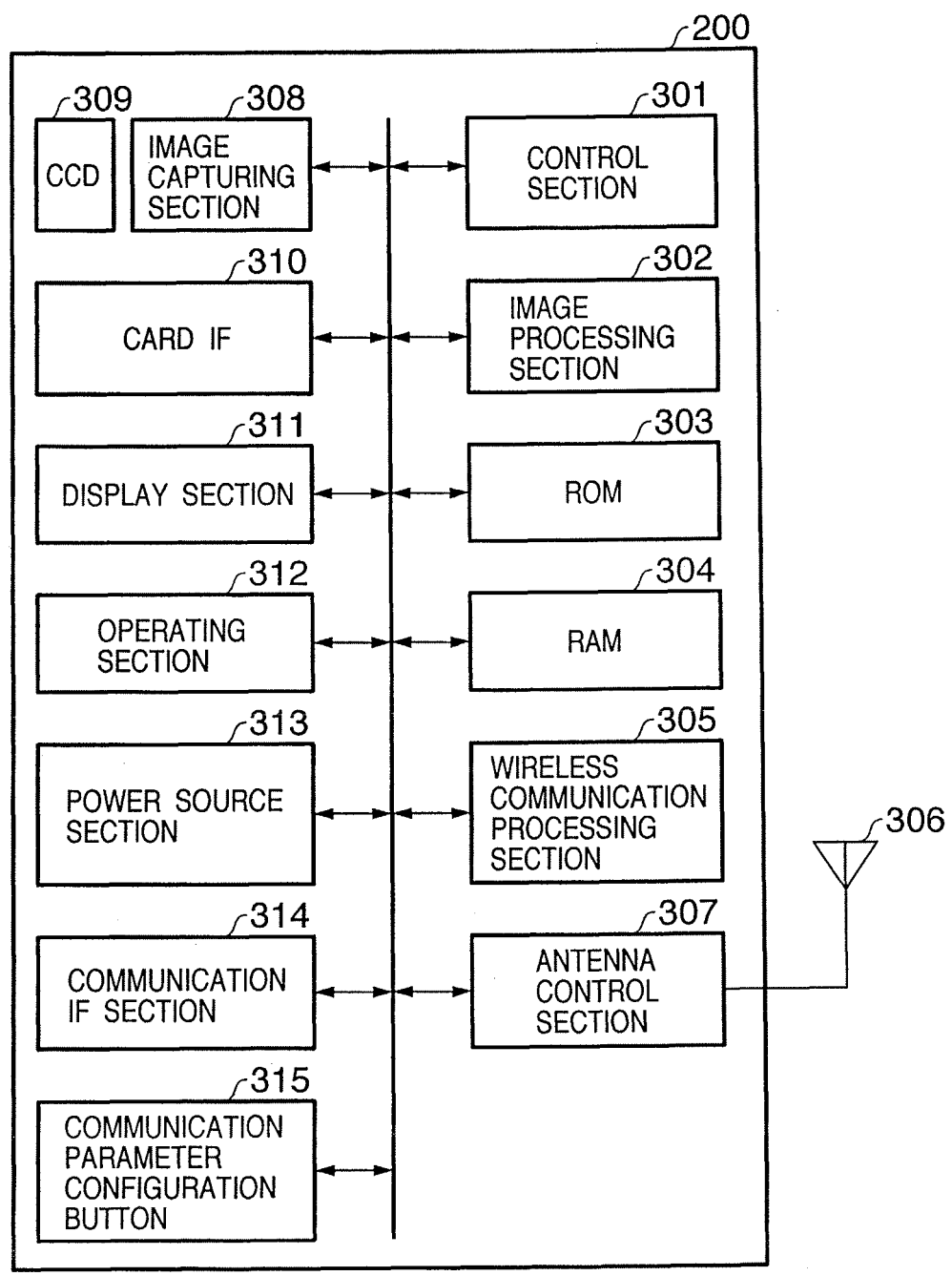
FIG. 3 is a schematic block diagram of an example of a configuration of a digital camera 200 (device A)

FIG. 3 is a schematic block diagram showing an example of a configuration of the digital camera 200 (device A). In FIG. 3, reference numeral 301 denotes a control section that controls the digital camera 200, 302 denotes an image processing section, 303 denotes a ROM storing control instructions (programs) and control data, and 304 denotes a RAM. Configuration communication parameters for forming a communication parameter configuration network are stored in the RAM 304 in advance. 305 denotes a wireless communication processing section that performs communication control for the wireless LAN. 306 denotes an antenna, and 307 an antenna control section.

Reference numeral 308 denotes an image capturing section that captures pixel signals inputted from a CCD 309. 310 denotes a card interface that controls a storage media card for storing captured images or configuration information, while 311 denotes a display section for displaying error messages and the like. 312 denotes an operating section, and includes buttons for issuing instructions on shooting, playback and configuration. 313 denotes a power source section that includes a secondary battery. 314 denotes a non-wireless communication interface, and comprises a wired interface such as USB or IEEE1394. 315 denotes a communication parameter configuration button, and activates communication parameter configuration.

Figure 4:
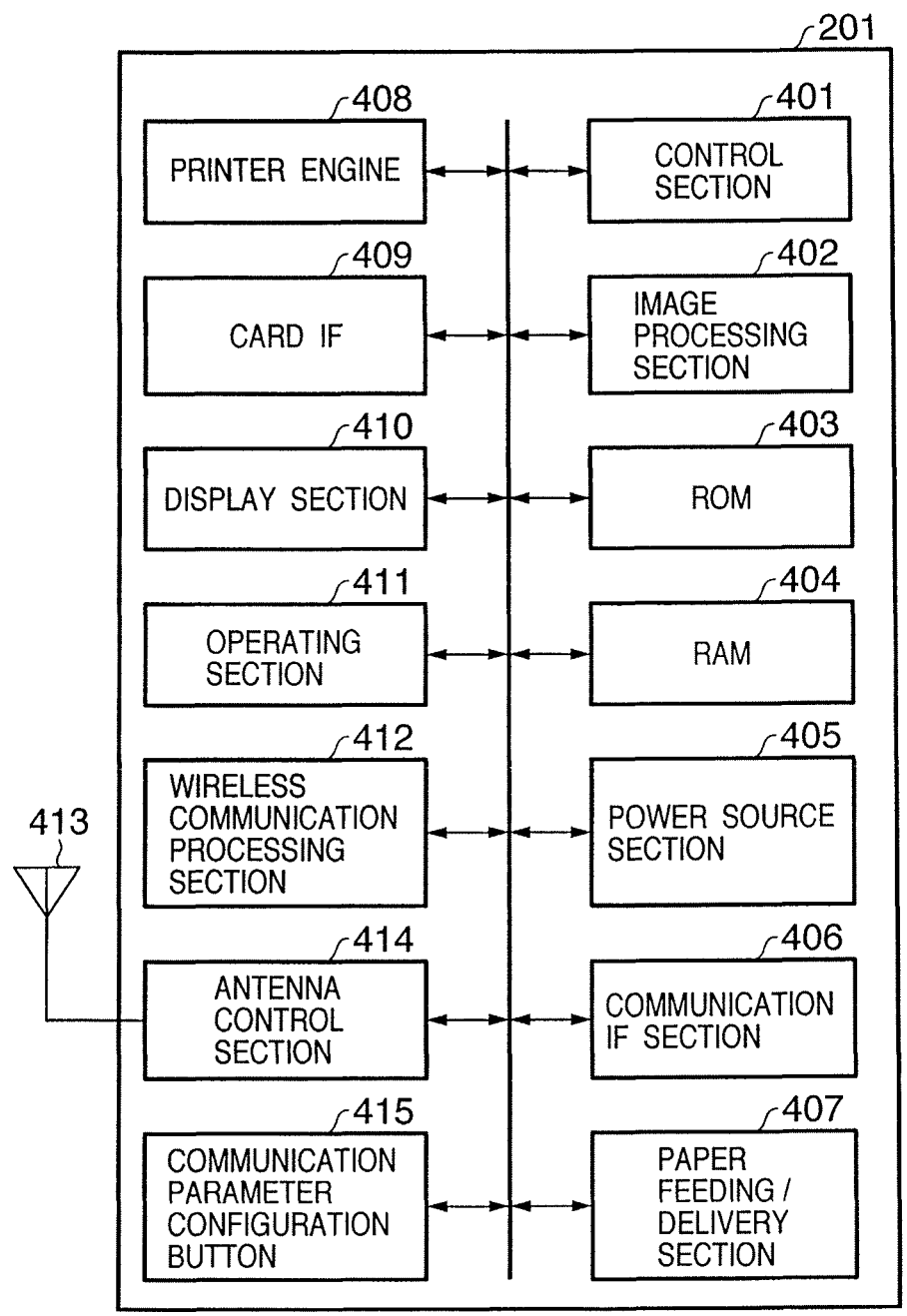
FIG. 4 is a schematic block diagram of an example of a configuration of a printer 201 (device B)

FIG. 4 is a schematic block diagram showing an example of a configuration of the printer 201 (device B). In FIG. 4, reference numeral 401 denotes a control section for controlling the printer 201, 402 denotes an image processing section, 403 denotes a ROM storing control instructions (programs) and control data, 404 denotes a RAM, and 405 denotes a power source section. Configuration communication parameters for forming a communication parameter configuration network are stored in the RAM 404 in advance. 406 denotes a non-wireless communication interface, and comprises a wired interface such as USB or IEEE1394.

Reference numeral 407 denotes a paper feeding/eject section to feed/eject paper for the printer. 408 denotes a printer engine that performs printing control using methods such as the electro-photographic method or the inkjet method. 409 denotes a card interface that controls a storage media card storing images, while 410 denotes a display section. 411 denotes an operating section, and includes menu, configuration and other buttons. 412 denotes a wireless communication processing section that performs communication control for the wireless LAN. 413 denotes an antenna, and 414 an antenna control section. 415 denotes a communication parameter configuration button that activates communication parameter configuration.

The above-described hardware configuration is only one example of a preferred embodiment according to the present embodiment, and it is to be understood that the present invention is not limited to this hardware configuration. Any hardware configuration to which the spirit of the present invention is applicable may be used.

In addition, while a digital camera and a printer have been described as wireless communication devices, it is to be understood that the present invention is not limited to these devices, and may be applied to various devices such as personal computers (PCs), facsimiles, multiple function machines, and notebook PCs.

The sequence of establishing a communication parameter configuration network when the communication parameter configuration button 220 is first pressed on the digital camera 200 (device A), and the communication parameter configuration button 221 is next pressed on the printer camera 201 (device B) will now be described.

Figure 5:
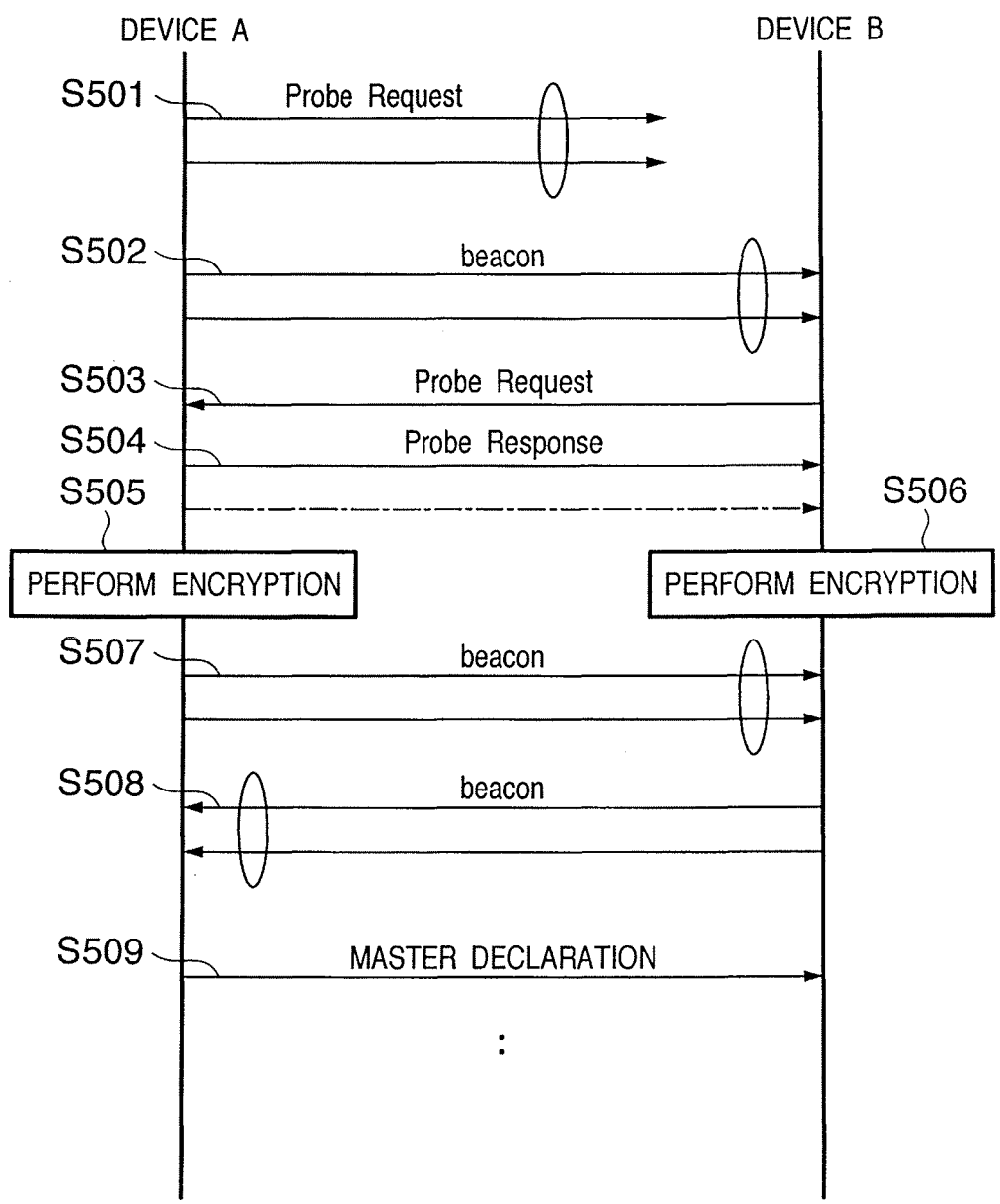
FIG. 5 is a diagram illustrating a sequence when two devices have communication parameter configuration control functions.

FIG. 5 is a diagram illustrating a sequence when two devices have communication parameter configuration control functions. First, when a user presses the communication parameter configuration button 220 of the digital camera 200 (device A) to activate its communication parameter configuration function, the device A initiates formation of a communication parameter configuration network. This prompts the device A to transmit a probe request (S501) to a wireless segment. In the example shown in FIG. 5, since a wireless device does not yet exist in the neighborhood, the device A transmits a beacon (S502) and becomes an IBSS (independent basic service set) creator of an ad hoc network.

Next, as the device B is activated in the same manner as with the device A, the device B transmits a probe request (S503). Since the device A already exists as an IBSS creator, a probe response (S504) is sent from the device A towards the device B in response to the probe request. A communication parameter configuration network is thereby formed between the devices A and B.

Once a communication parameter configuration network is formed, the devices A and B perform encryption (S505 and S506). Encryption algorithms are not specifically prescribed. For instance, the encryption processing may be performed based on a common key stored in advance in the devices. Additionally, the encryption processing may be performed by either wireless communication processing sections 305 and 412, or by control sections 301 and 401.

The master device determination step 102 shown in FIG. 1 is now commenced. In this case, the IBSS creator and a joiner both continue to mutually transmit beacons (S507 and S508). Then, when a predetermined algorithm determines one of the devices as the master device, a master declaration (S509) is transmitted from the master device.

Since communication between the devices A and B have been encrypted by the above steps S505 and S506, all communication from this master device determination step 102 and onwards will be securely performed.

Processing for performing encryption while establishing an ad hoc mode communication parameter configuration network with an IEEE 802.11x compliant wireless LAN between three wireless communication devices, and preventing network participation by unexpected devices will now be described.

Figure 6:
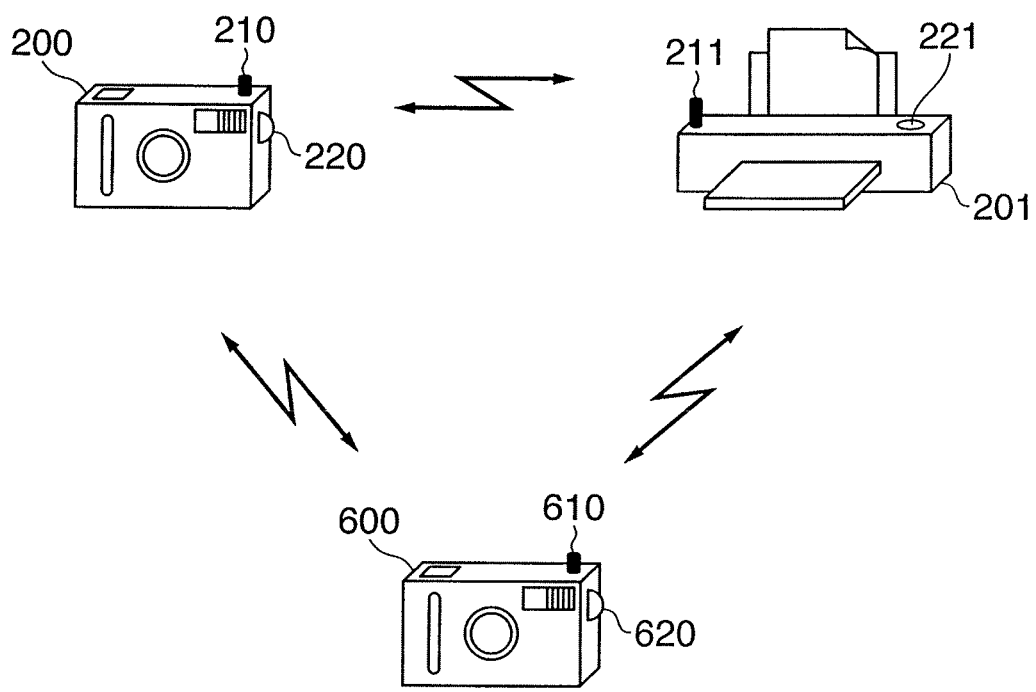
FIG. 6 is a diagram showing an example of a configuration of an ad hoc network of three wireless communication devices.

FIG. 6 is a diagram showing an example of a configuration of an ad hoc network of three wireless communication devices. As shown in FIG. 6, wireless communication devices A and B are respectively the digital camera 200 and the printer 201 shown in FIG. 2. A device C is a digital camera 600 similar to the device A having an IEEE 802.11x compliant wireless LAN as its wireless communication function 610, and becomes capable of establishing a network in communication parameter configuration mode by pressing a communication parameter configuration button 620.

The configuration of the digital camera 600 (device C) is the same as the configuration of the digital camera 200 (device A) shown in FIG. 3, and therefore will not be described here.

First, the communication parameter configuration button 220 is pressed on the digital camera 200 (device A). The communication parameter configuration button 221 is next pressed on the printer 201 (device B), thereby establishing an ad hoc mode communication parameter configuration network. A sequence initiated when the communication parameter configuration button 620 on the digital camera 600 (device C) is pressed will now be described.

Figure 7:
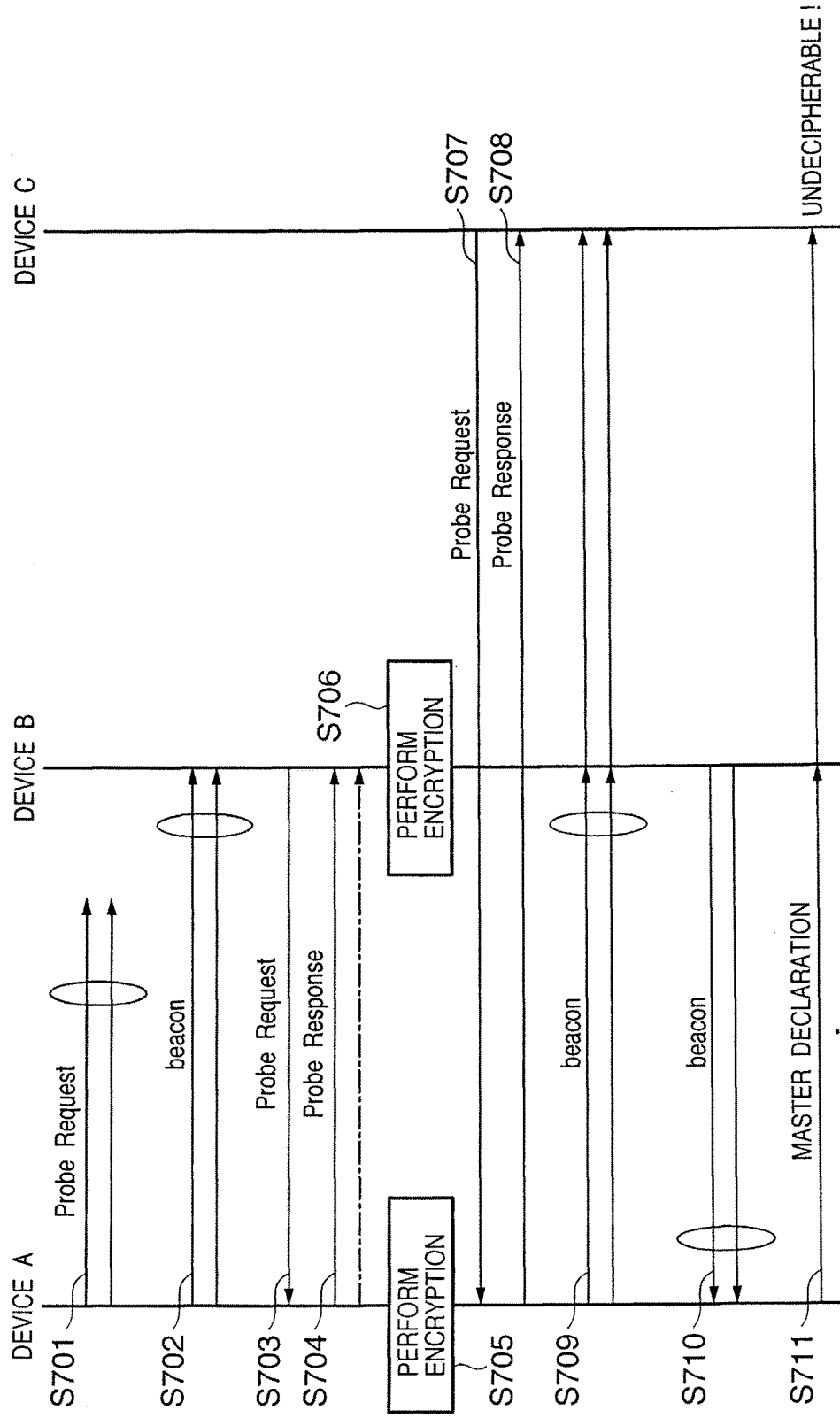
FIG. 7 is a diagram illustrating a sequence when three devices have communication parameter configuration control functions.

FIG. 7 is a diagram illustrating a sequence when three devices have communication parameter configuration control functions. First, a communication parameter configuration network is established (Steps S701 to S706) in the same way as the formation of a communication parameter configuration network between the devices A and B (Steps S501 to S506) as shown in FIG. 5.

At this point, power of the device C, which is an unexpected third device, is activated. The device C initiates its communication parameter configuration function in the same way as the devices A and B. The device C transmits a probe request (S707), and since the device A already exists as an IBSS creator, a probe response (S708) is transmitted from the device A towards the device C as a response to the probe request. The device C thereby participates in the communication parameter configuration network.

However, because the device C is an unexpected third party, encryption has not yet been performed as between the devices A and B. Therefore, after establishment of the communication parameter configuration network, the device C is unable to recognize a master declaration (S711) from the master device determined by the master device determination step 102.

As seen, by performing encryption on communication, participation by unexpected third party devices to the communication parameter configuration network can be prevented.

Next, using FIG. 8, a sequence (FIG. 7) of establishing a communication parameter configuration network between the devices A, B and C will be described from the viewpoint of the processing performed by the devices.

Figure 8:
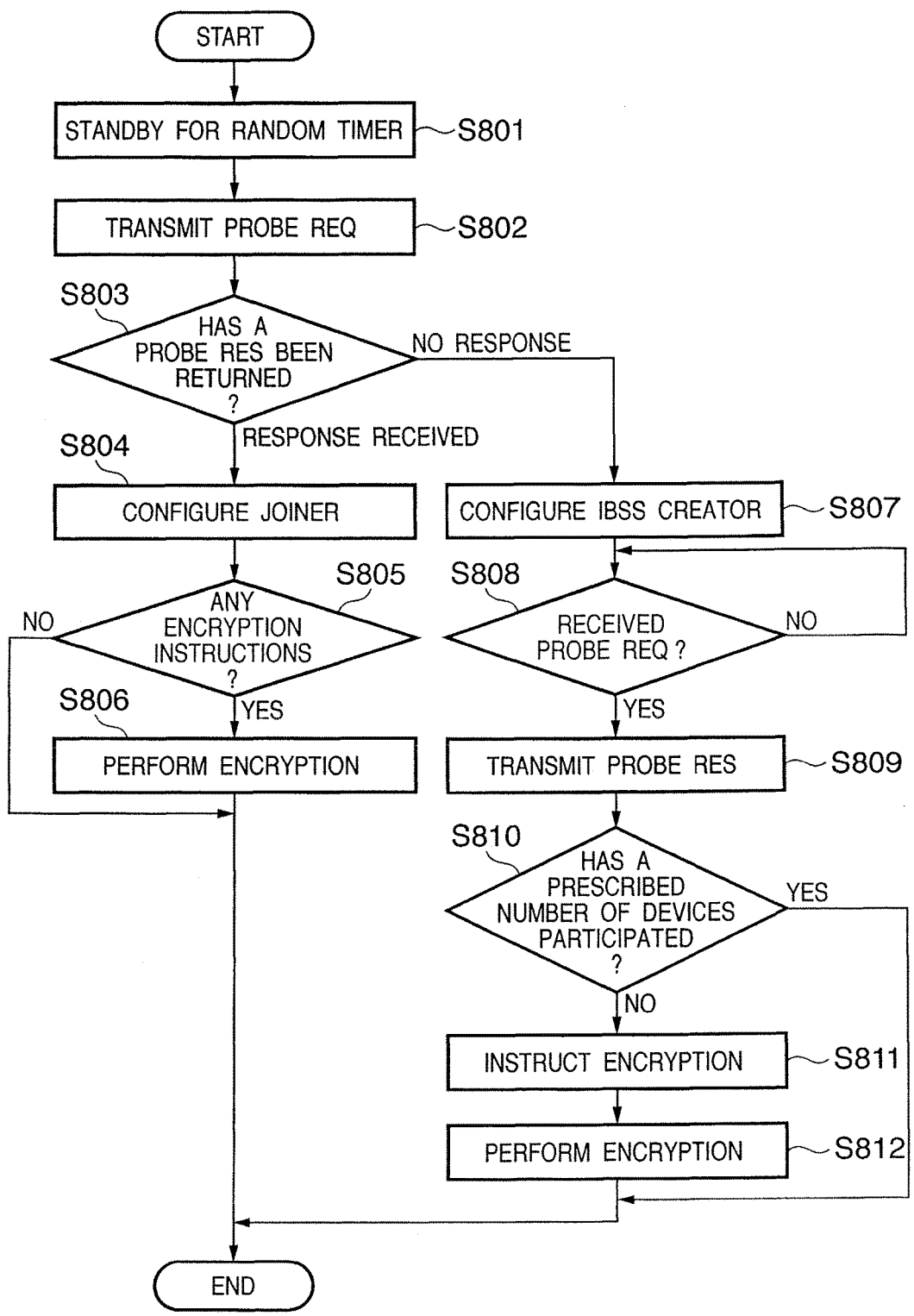
FIG. 8 is a flowchart showing processing performed by a device according to a first embodiment when establishing a communication parameter configuration network.

FIG. 8 is a flowchart showing processing performed by a device according to a first embodiment when establishing a communication parameter configuration network. First, when either power or a wireless communication function is activated at the device, a random timer is activated, and the device waits for time-out of the timer (S801). This processing is performed to avoid conflicts among probe requests generated when a plurality of devices are simultaneously turned on. When the random timer times out, the device transmits a probe request (S802). The device next waits for a response to the probe request (S803).

Next, when a probe response is transmitted in response to the probe request (response transmitted in S803), the device is configured as a joiner (S804). In the case the device is a joiner, if the number of devices participating in the communication parameter configuration network is within a prescribed number, the device receives an encryption instruction from the IBSS creator. At this point, when an encryption instruction is received (YES in S805), the device, namely device B, enables encryption (S806).

Meanwhile, when an encryption instruction is not received (NO in S805), this means that the device was unable to participate in the communication parameter configuration network, and the processing terminates as is.

On the other hand, when a probe response is not transmitted in response to the probe request (no in S803), it is determined that a communication parameter configuration network does not exist in the vicinity of this device. Thus, this device, namely device A, performs configuration as an IBSS creator (S807). Then, as a function of an IBSS creator, the device stands by for probe requests from other devices (S808).

When the device configured as the IBSS creator acknowledges probe requests from other devices (YES in S808), the device transmits probe responses to the other devices (S809). At this point, the IBSS creator memorizes the number of devices to which probe responses were transmitted, and determines whether the number of devices has reached a predetermined prescribed number (S810). If the prescribed number has been reached (YES in S810), processing is terminated as is.

On the other hand, when the prescribed number has not been reached (NO in S810), the IBSS creator issues encryption instructions to the joiners under the IBSS creator (S811). Next, when the encryption instructions have reached all intended destinations, the IBSS creator enables its own encryption (S812).

According to the first embodiment, the IBSS creator counts the number of devices participating in the communication parameter configuration network, and when the number of devices exceeds a prescribed number, ensures that encryption instructions are not transmitted to any other device subsequently desiring to participate in the communication parameter configuration network. Thus, participation of third parties or third parties with malicious intent in the communication parameter configuration network can be denied.

Second Embodiment

Next, a detailed description of a second embodiment according to the present invention will be provided with reference to the drawings. The first embodiment prevented participation by third parties to a communication parameter configuration network by imposing restrictions on the number of participating devices when establishing the communication parameter configuration network. The second embodiment prevents participation by third parties during the device capability collection step 103.

As shown in FIG. 6, processing for preventing participation to a network by an unexpected third party while two wireless communication devices perform communication parameter configuration will be described for the second embodiment.

Figure 9:
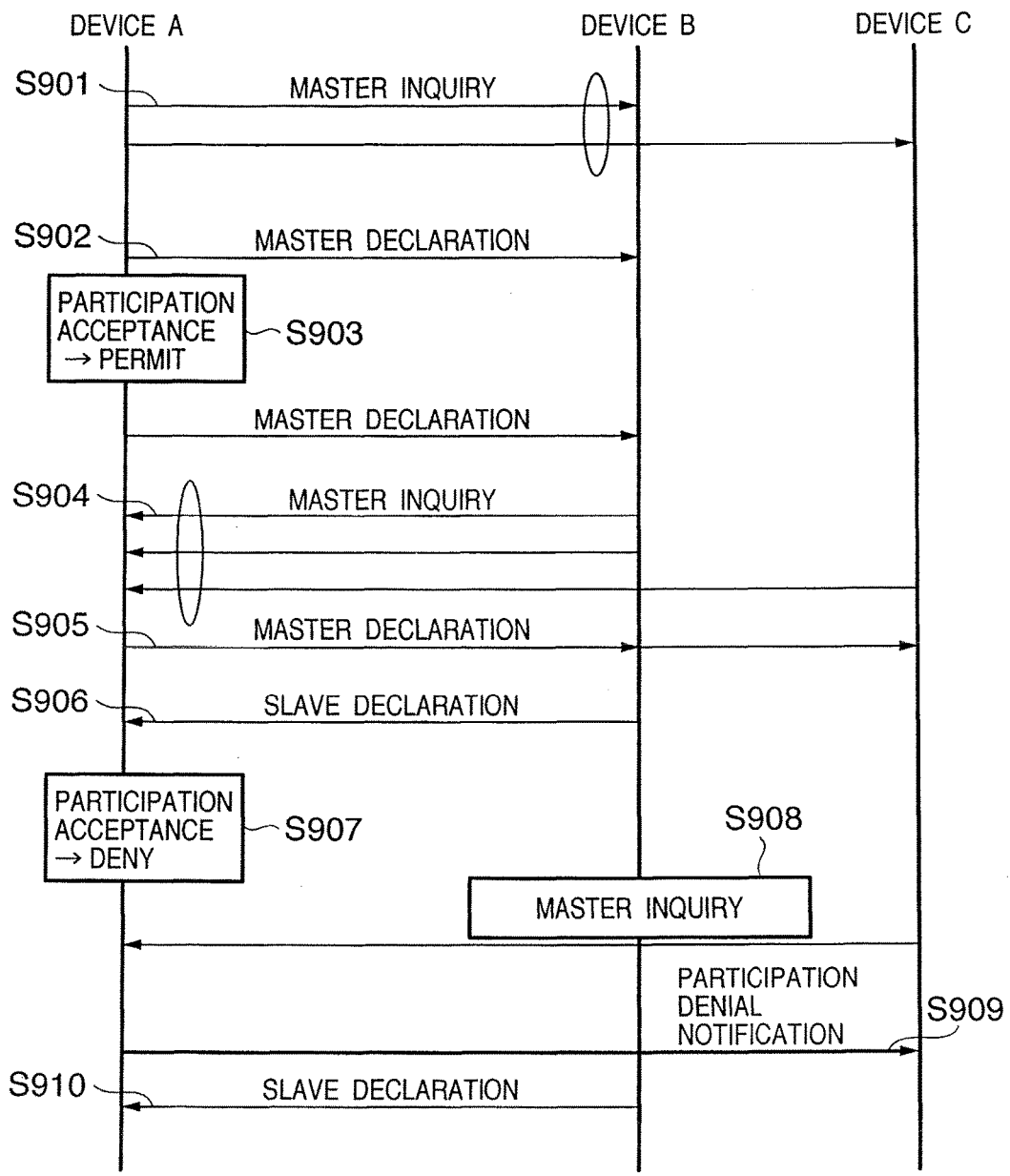
FIG. 9 is a diagram illustrating the sequence from a determination step for determining a master device having a communication parameter configuration control function to a device capability collection step, according to a second embodiment.

FIG. 9 is a diagram illustrating the sequence from a determination step for determining a master device having a communication parameter configuration control function to a device capability collection step, according to the second embodiment. In FIG. 9, it is assumed that the communication parameter configuration network formation step 101 of FIG. 1 has already been completed between the devices A and B, and that the device A is the IBSS creator, while devices B and C are joiners.

The device A transmits a master inquiry message (S901) as a broadcast message. At this point, the master device determination step 102 has just commenced and a master device does not yet exist. Thus, a response to the master inquiry message (S901) is not transmitted.

Therefore, the device A configures itself as the master device, terminates transmission of the master inquiry message (S901), and instead commences transmission of a master declaration message (S902). Upon transmitting the first master declaration message, an internally retained participation acceptance condition is configured to "permit" (S903).

Next, after a lapse of a random interval, the device B transmits a master inquiry message (S904). At this time, the device A transmits a master declaration message (S905) once it acknowledges transmission of the master inquiry message (S904) by the device B. On the other hand, upon receiving the master declaration message (S905) transmitted by the device A, the device B transmits a slave declaration message (S906).

Incidentally, in this example, it is assumed that the prescribed number of devices to compose the communication parameter configuration network preconfigured in the device A is two.

When the device A receives the slave declaration message (S906) from the device B, the device A changes its internally retained participation acceptance condition to "deny" (S907). Since the participation acceptance condition of the master device is now "deny", the processing of the device capability collection step 103 and onwards will be performed solely between the devices A and B.

For instance, suppose a third device, device C, attempts to participate at this point. The device C first transmits a master inquiry message (S908) in the same manner as the devices A and B. The device A, which has already assumed the role of the master device in this communication parameter configuration network, receives the master inquiry message (S908) from the device C.

At this point, the device A references its internally retained participation acceptance condition. In this example, since the participation acceptance condition has already been changed to "deny", the device A transmits a participation denial notification message (S909) to the device C. This participation denial notification message (S909) is transmitted only to the device C, while communication with the device B continues. The device B periodically transmits a slave declaration message (S910) to the device A.

Following the above description on the sequence between the devices, processing performed by the master-side device and the slave-side device will now be described. Description on the determination method of the master and slave devices of the master device determination step 102 will be omitted. First, the processing performed by the master-side device will be described using FIG. 10.

Figure 10:
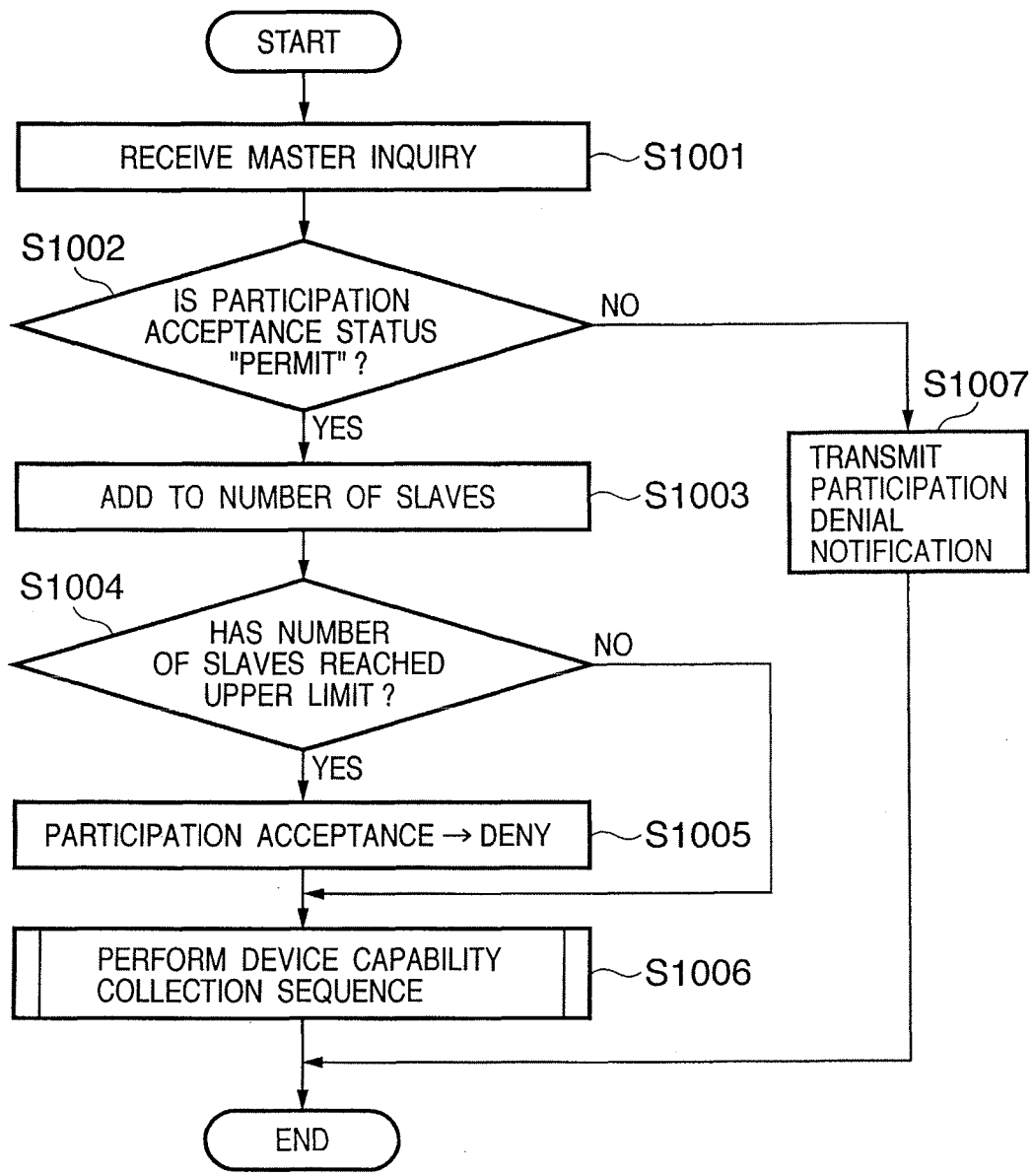
FIG. 10 is a flowchart showing processing of a master-side device having a communication parameter configuration control function, according to the second embodiment.

FIG. 10 is a flowchart showing processing of a master-side device having a communication parameter configuration control function, according to the second embodiment. It is assumed that a device having a communication parameter configuration control function determines apparatus types already determined in the master device determination step 102, and acknowledges that the device itself is the master-side device.

The master-side device receives master inquiry messages from the other network participating devices (S1001). Once the master inquiry messages are received, the master-side device references its internally retained participation acceptance condition (S1002).

When the participation acceptance condition is "deny" (NO in S1002), participation denial notification messages are sent to the transmission source devices of the master inquiry messages (S1007), and communication with the transmission source devices of the master inquiry messages is terminated.

On the other hand, when the participation acceptance condition is "permit" (YES in S1002), a number of slaves retained in a RAM 304 is added (S1003). The added number of slaves is next determined whether it has reached an upper limit (S1004). When the number of slaves has reached the upper limit (YES in S1004), the master device changes the participation acceptance condition retained in the RAM 304 from "permit" to "deny" (S1005). Due to this processing, all subsequent participation in the network by new slave devices can be denied.

Meanwhile, if the number of slaves has not reached the upper limit (NO in S1004), the participation acceptance condition remains unchanged. The master device performs exchange of the sequence of the next device capability collection step 103 with the group of slave devices (S1006).

Following the above description on the processing by the master-side device, processing performed by the slave-side devices will now be described.

Figure 11:
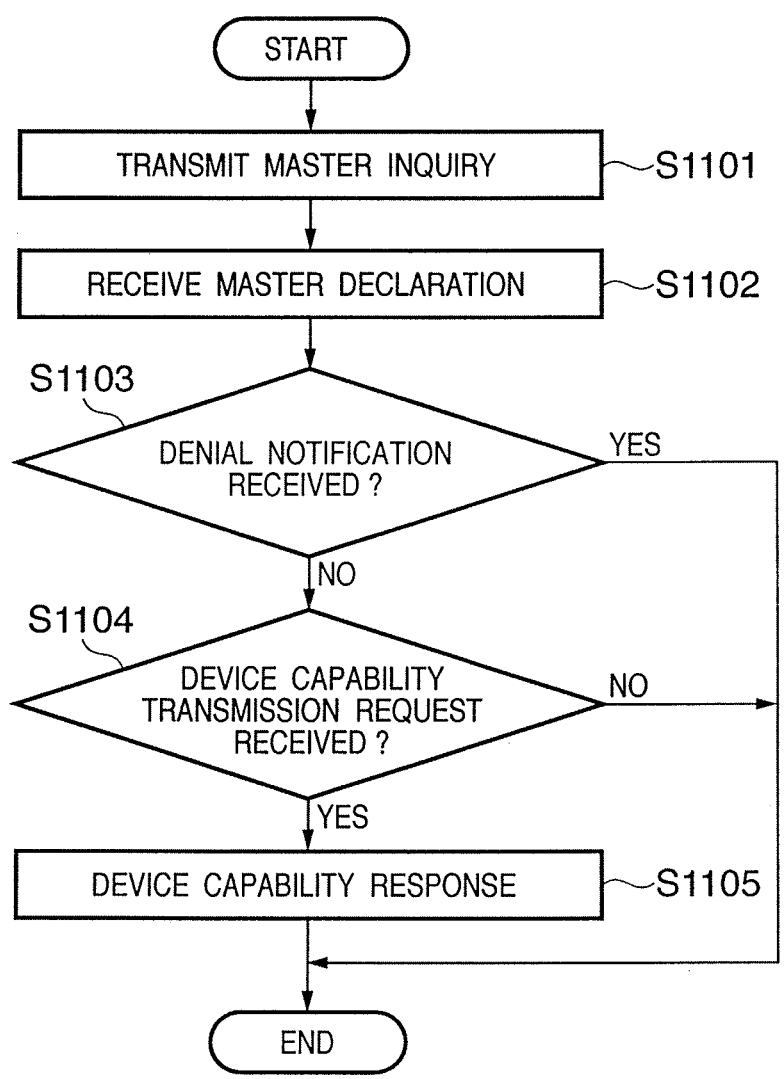
FIG. 11 is a flowchart showing processing of a slave-side device having a communication parameter configuration control function, according to the second embodiment.

FIG. 11 is a flowchart showing processing of a slave-side device having a communication parameter configuration control function, according to the second embodiment. It is assumed that a device having a communication parameter configuration control function determines apparatus types already determined in the master device determination step 102, and acknowledges that the device itself is a slave-side device.

The slave-side device transmits a master inquiry messages towards the master-side device (S1101). The device next monitors whether a master declaration message will be transmitted from the master-side device (S1102). The slave-side device thereby acknowledges the existence of the master-side device.

The slave-side device next verifies whether a participation denial notification message is transmitted from the master-side device (S1103). If a participation denial notification message is not transmitted from the master-side device (NO in S1103), the slave-side device proceeds to determine whether a device capability transmission request will be transmitted (S1104). This determination processing is performed because reception failure or the like of participation denial notifications due to factors such as propagation status of communication pathways can be anticipated.

When a device capability transmission request is received, the slave-side device transmits (S1105) a device capability response towards the master-side device, which is the transmission source of the device capability transmission request.

On the other hand, when the slave-side device either receives a participation denial notification message from the master-side device (YES in S1103), or does not receive a device capability transmission request (NO in S1104), the slave-side device determines that its participation in the communication parameter configuration network has been denied. The slave-side device next terminates communication with the communication parameter configuration network, and terminates its wireless communication function.

Incidentally, when participation in the communication parameter configuration network has been denied, the slave-side device can be arranged so as to display the participation denial via a user interface.

As seen, by performing the above-described series of processing, it is possible to limit the number of devices that can participate in the wireless parameter configuration network.

Third Embodiment

Next, a detailed description of a third embodiment according to the present invention will be provided with reference to the drawings. In the first and second embodiments, a state of participation of a prescribed number of devices was described as the participation state of wireless devices participating in a communication parameter configuration network. In the third embodiment, a description will be provided on a case where participation to a communication parameter configuration network is limited by time.

As shown in FIG. 6, processing for preventing participation to a network by an unexpected third party while two wireless communication devices perform communication parameter configuration will also be described for the third embodiment.

Figure 12:
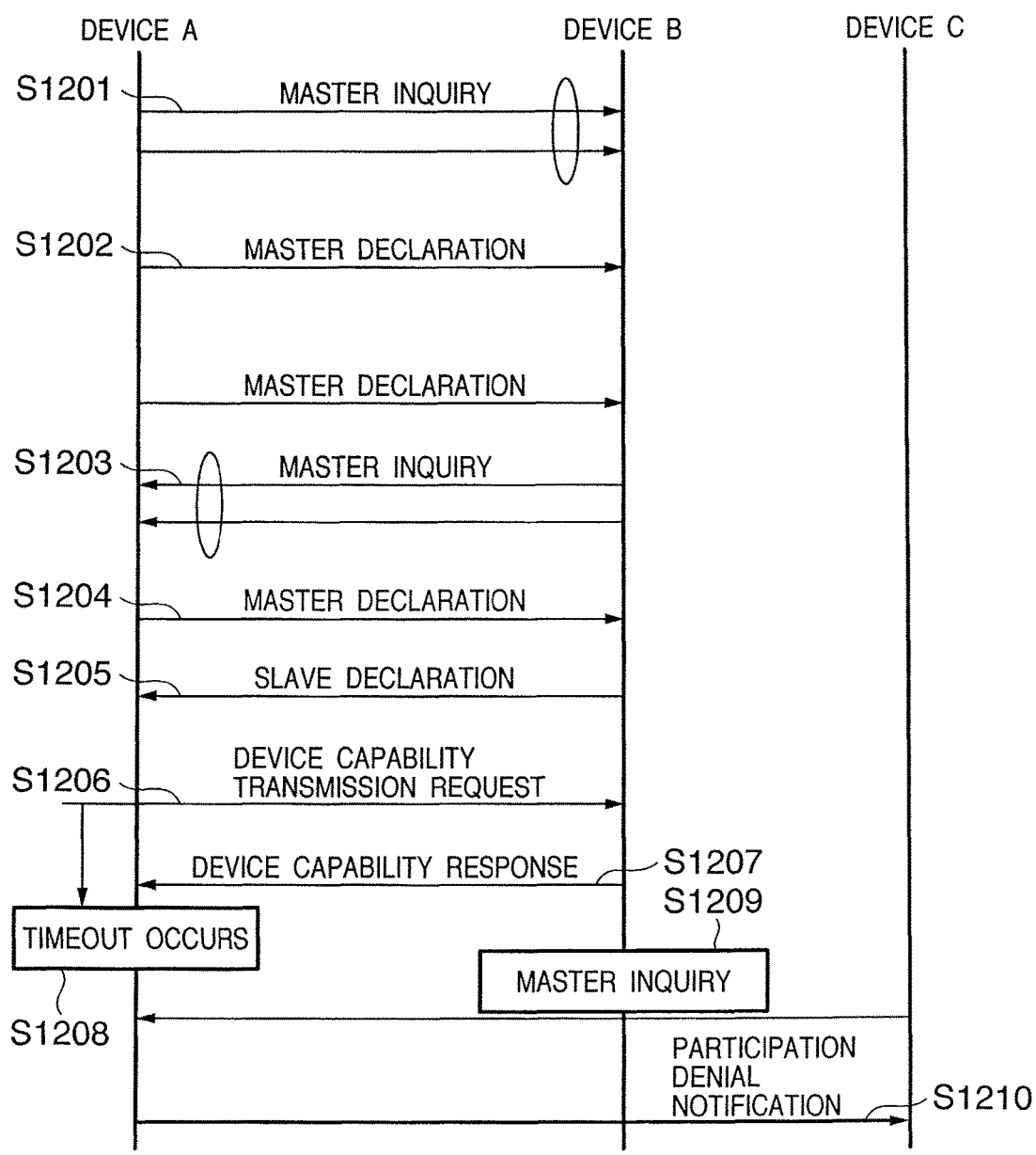
FIG. 12 is a diagram illustrating the sequence from a determination step for determining a master device having a communication parameter configuration control function to a device capability collection step, according to a third embodiment.

FIG. 12 is a diagram illustrating the sequence from a determination step for determining a master device having a communication parameter configuration control function to a device capability collection step, according to a third embodiment. In FIG. 12, it is assumed that the communication parameter configuration network formation step 101 of FIG. 1 has already been completed between the devices A and B, and that the device A is the IBSS creator, while devices B and C are joiners.

The device A transmits a master inquiry message (S1201) as a broadcast message. At this point, the master device determination step 102 has just commenced and a master device does not yet exist. Thus, a response to the master inquiry message (S1201) will not be transmitted.

Therefore, the device A configures itself as the master device, terminates transmission of the master inquiry message (S1201), and instead commences transmission of a master declaration message (S1202).

Next, after a lapse of a random interval, the device B transmits a master inquiry message (S1203) as a broadcast message. At this time, the device A transmits a master declaration message (S1204) once it acknowledges transmission of the master inquiry message (S1203) by the device B. On the other hand, upon receiving the master declaration message (S1204) transmitted by the device A, the device B transmits a slave declaration message (S1205).

When the device A receives the slave declaration message (S1205) from the device B, the device A commences the device capability collection step 103 shown in FIG. 1. In other words, the device A transmits a device capability collection request (S1206), while master-side device simultaneously starting a participation acceptance timer. Transition of the status to the next communication parameter configuration direction determination step 104 is achieved by receiving a device capability response (S1207) from the device B during the activation of the participation acceptance timer.

Afterwards, upon occurrence of a timeout of the participation acceptance timer (S1208), the device A changes the participation acceptance status to "deny". This makes all subsequent, new participations in the communication parameter configuration network impossible.

At this point, for instance, if the device C transmits a master inquiry message (S1209), the device A transmits a participation denial notification message (S1210) to the device C to deny its participation in this communication parameter configuration network.

Although FIG. 12 describes a case where a slave device (device C) attempts participation when the devices A and B have already transited to the device capability collection step 103, the present invention is not limited to this example. For instance, the present invention can also be applied to a state where two slave devices (devices B and C) already exist and have both transited to the device capability collection step 103.

Figure 13:
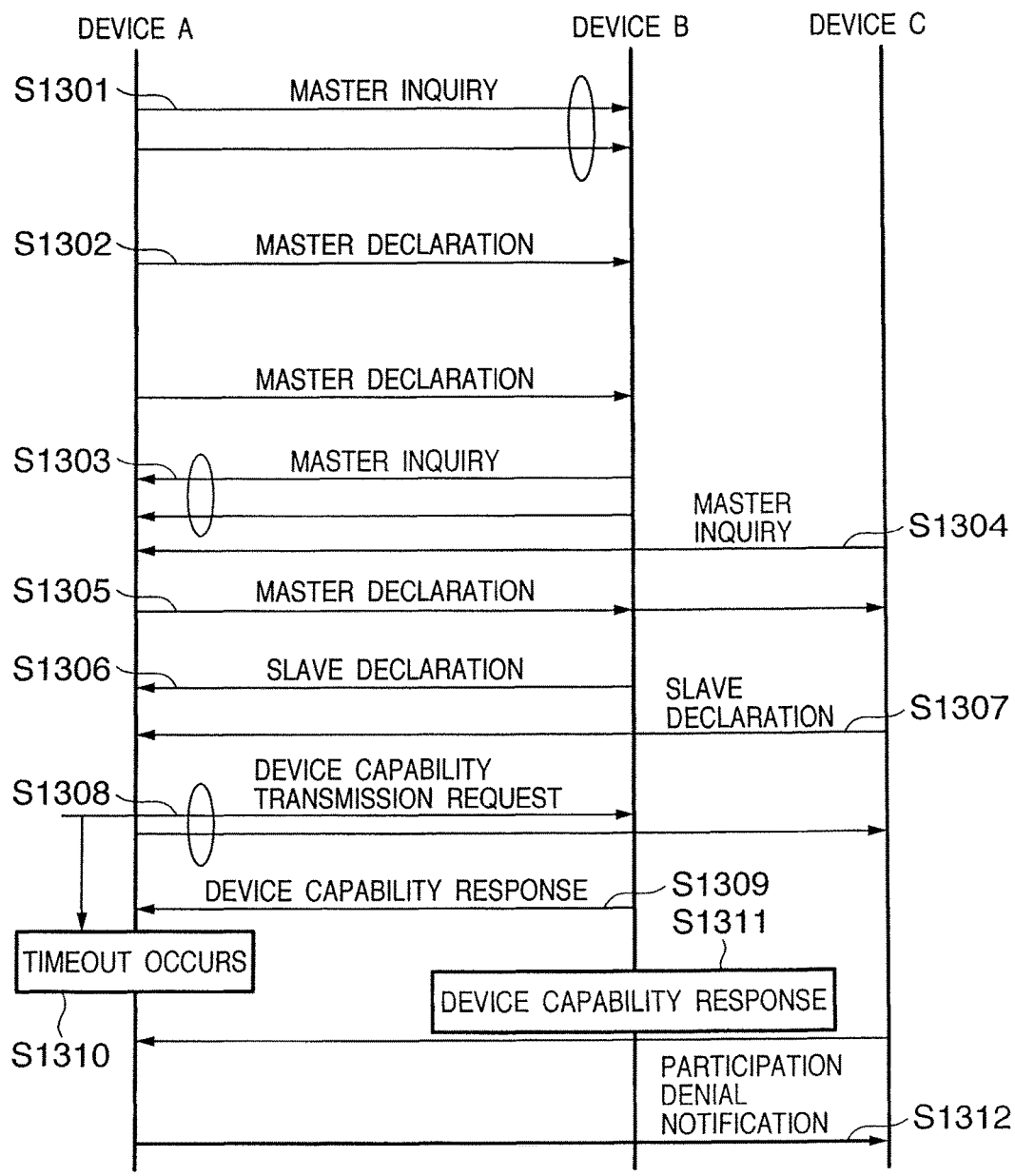
FIG. 13 is a diagram illustrating a sequence of three devices having communication parameter control functions from a determination step for determining a master device having a communication parameter configuration control function to a device capability collection step, when two slave devices have respectively transited to the device capability collection step.

FIG. 13 is a diagram illustrating a sequence where two slave devices have respectively transited to the device capability collection step. In FIG. 13, it is assumed that the communication parameter configuration network formation step 101 of FIG. 1 has already been completed among the devices A, B and C, and that the device A is the IBSS creator, while devices B and C are joiners.

The device A transmits a master inquiry message (S1301) as a broadcast message. At this point, the master device determination step 102 has just commenced and a master device does not yet exist. Thus, a response to the master inquiry message (S1301) will not be transmitted.

Therefore, the device A configures itself as the master device, terminates transmission of the master inquiry message (S1301), and instead commences transmission of a master declaration message (S1302).

Next, after a lapse of a random interval, the device B transmits a master inquiry message (S1303) as a broadcast message. The device C also transmits a master inquiry message (S1304) in the same way as the device B. At this time, the device A transmits a master declaration message (S1305) once it acknowledges transmission of the master inquiry messages (S1303 and S1304) from the devices B and C.

On the other hand, upon receiving the master declaration message (S1305) transmitted by the device A, the device B transmits a slave declaration message (S1306). The device C also transmits a slave declaration message (S1307), in the same way as the device B, upon receiving the master declaration message (S1305) transmitted by the device A.

Next, when the device A receives the slave declaration messages (S1306 and S1307) from the devices B and C, the device A commences the device capability collection step 103 shown in FIG. 1. In other words, the device A transmits a device capability collection request (S1308) as a broadcast transmission, while simultaneously starting a participation acceptance timer. Transition of the status to the next communication parameter configuration direction determination step 104 is achieved by receiving a device capability response (S1309) from the device B during the activation of the participation acceptance timer.

Afterwards, upon occurrence of a timeout of the participation acceptance timer (S1310), the device A changes the participation acceptance status to "deny". This makes all subsequent, new participations in the communication parameter configuration network impossible.

At this point, for instance, if the device C transmits a device capability response (S1311) after the participation acceptance timer has timed out, the device A transmits a participation denial notification message (S1312) to the device C to deny its participation in this communication parameter configuration network.

In the third embodiment, while a case where only the device C times out has been described, participation by the device B will also be denied in the case where the device B is only able to transmit a device capability response after the timeout.

Figure 14:
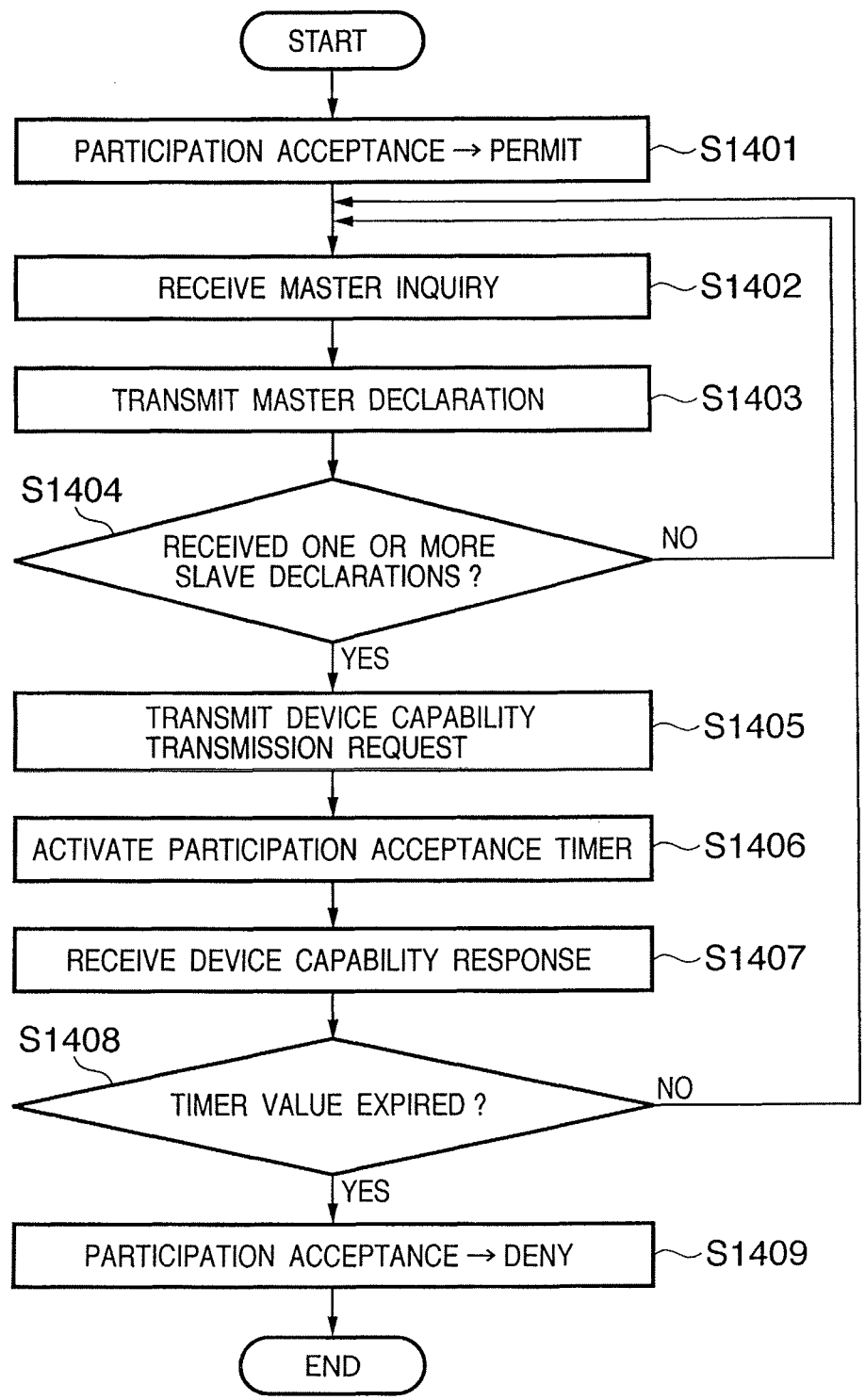
FIG. 14 is a flowchart showing processing by a master-side device according to the third embodiment.

Next, processing by the devices to achieve the above-described sequence will be describing using FIG. 14.

FIG. 14 is a flowchart showing processing by a master-side device according to the third embodiment. Since the processing by a slave-side device is identical to that in the second embodiment, a description thereof will be omitted.

First, when a device having a communication parameter configuration control function determines itself to be the master-side device, the device performs initial configuration by configuring the participation acceptance status to "permit" (S1401). The device next waits to receive master inquiries from other devices having communication parameter configuration control functions that will become slave-side devices, and receives the master inquiries from the other devices (S1402). Next, upon receiving the master inquiries, the master-side device transmits a master declaration to the transmission sources of the master inquiries (S1403).

On the other hand, the transmission source devices of the master inquiries determines themselves to be slave-side devices by receiving the master declaration, and transmit slave declarations to the transmission source device of the master declaration. The master-side device that receives the slave declarations determines whether slave declarations have been received from one or more communication devices (S1404). When slave declarations have not been received from one or more communication devices (NO in S1404), this means that there are no slave-side devices owned by the master-side device, and the master device returns processing to a master inquiry standby state (S1402) until a slave-side device appears.

On the other hand, when slave declarations have been received from one or more devices (YES in S1404), the master-side device transmits a device capability transmission request (S1405). After transmission of the device capability transmission request, a participation acceptance timer is initiated (S1406). Subsequently, after transmitting device capability transmission request, when the master-side device receives device capability responses from the slave-side devices (S1407), the master-side device transits to the communication parameter transfer direction determination step 104.

Afterwards, a timer value of the participation acceptance timer is determined. If the timer value has expired (YES in S1408), the participation acceptance status is changed to "deny" (S1409).

On the other hand, if the timer value has not expired (NO in S1408), processing once again transits to a master inquiry message reception standby state (S1402).

In the third embodiment, while the participation acceptance timer has been configured so that it is activated after transmission of the device capability transmission request. However, the participation acceptance timer can also be configured so that it is activated upon participation by the first slave-side device after establishing the communication parameter configuration network. In this case, it is sufficient to merely switch around S1405 and S1406 shown in FIG. 14.

In addition, the above-described participation acceptance timer can also be configured to be activated immediately following the start of master declaration transmission and after S1403 shown in FIG. 14, instead of during transmission of the device capability transmission request.

Moreover, it is also possible to expand function so that the participation acceptance period can be extended at the discretion of the user upon expiration of the timer via a predetermined user interface.

As seen, in the third embodiment, acceptance of participation to a communication parameter configuration network is controlled by determining whether device capability responses have been received within a certain period of time as the participation state of wireless devices participating in the network.

Fourth Embodiment

Next, a detailed description of a fourth embodiment according to the present invention will be provided with reference to the drawings. In devices having communication parameter configuration controlling functions, in addition to the methods of the first to third embodiments described above, modes for preventing participation by unnecessary devices in a communication parameter configuration network include, as a different perspective, a method according to device capabilities. The fourth embodiment determines device capabilities of devices attempting to participate in a communication parameter configuration network as the participation statuses of communication devices participating in the network.

For the fourth embodiment, as shown in FIG. 6, processing for preventing participation to a network by an unexpected third party while two wireless communication devices perform communication parameter configuration will also be described.

Figure 15:
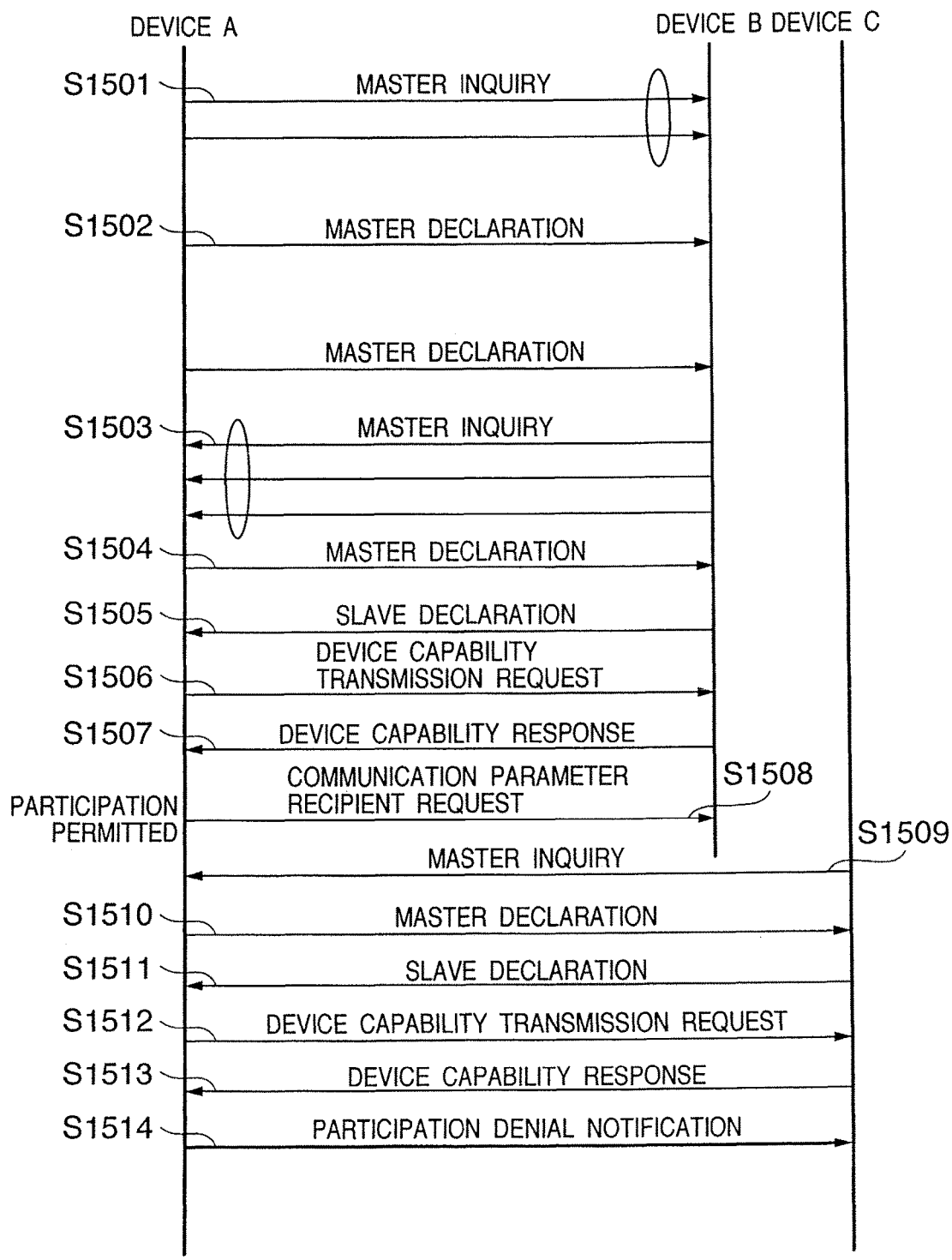
FIG. 15 is a diagram illustrating the sequence from a determination step for determining a master device having a communication parameter configuration control function to a device capability collection step, according to a fourth embodiment.

FIG. 15 is a diagram illustrating the sequence from a determination step for determining a master device having a communication parameter configuration control function to a device capability collection step, according to a fourth embodiment. In FIG. 15, it is assumed that the communication parameter configuration network formation step 101 of FIG. 1 has already been completed between the devices A and B, and that the device A is the IBSS creator, while devices B and C are joiners.

The device A transmits a master inquiry message (S1501) as a broadcast message. At this point, the master device determination step 102 has just commenced and a master device does not yet exist. Thus, a response to the master inquiry message (S1501) will not be transmitted.

Therefore, the device A configures itself as the master device, terminates transmission of the master inquiry message (S1501), and instead commences transmission of a master declaration message (S1502).

Next, after a lapse of a random interval, the device B transmits a master inquiry message (S1503) as a broadcast message. At this time, the device A transmits a master declaration message (S1504) once it acknowledges transmission of the master inquiry message (S1503) by the device B. On the other hand, upon receiving the master declaration message (S1504) transmitted by the device A, the device B transmits a slave declaration message (S1505).

When the device A receives the slave declaration message (S1505) from the device B, the device A commences the device capability collection step 103. In other words, the device A transmits a device capability transmission request (S1506). Meanwhile, upon receiving the device capability transmission request (S1506), the device B configures its own device capability, and transmits a device capability response (S1507) to the device A.

The device A next receives the device capability response (S1507) from the device B, and matches it with device capability information retained in a RAM 304 to determine whether the device B meets the device capability required by the device A. When it is determined that the device capability requirement is met, a communication parameter recipient request (S1508) is transmitted towards the device B. Upon receiving the communication parameter recipient request, the device B stands by for communication parameters to be transferred from the communication parameter provider in the communication parameter transfer step 105.

Next, after a lapse of a random interval, the device C transmits a master inquiry message (S1509). Upon acknowledging the transmission of the master inquiry message by the device C, the device A transmits a master declaration message (S1510).

On the other hand, upon receiving the master declaration message (S1510) transmitted by the device A, the device C transmits a slave declaration message (S1511).

When the device A receives the slave declaration message (S1511) from the device C, the device capability collection step 103 is initiated. In other words, the device A transmits a device capability transmission request (S1512). Meanwhile, by receiving the device capability collection request (S1512), the device C configures its own device capability, and transmits a device capability response (S1513) to the device A.

The device A next receives the device capability response (S1513) from the device C, and matches it with the device capability information retained in the RAM 304 to determine whether the device C meets the device capability required by the device A. Unlike in the case of the device B, when it is determined that the device C does not meet the device capability requirement, a participation denial notification message (S1514) is transmitted. Upon receiving the participation denial notification, the device C terminates its communication parameter configuration controlling function.

Although FIG. 15 describes a case where a new slave device (device C) attempts participation when the devices A and B have already transited to the device capability collection step 103, the present invention is not limited to this example. For instance, the present invention can also be applied to a state where two slave devices (devices B and C) already exist and have both transited to the device capability collection step 103.

Next, processing performed by the devices to achieve the above-described sequence shown in FIG. 15 will be described using FIG. 16. The description will involve only the processing performed by the master-side device. Processing by the slave-side devices is identical to that in the second embodiment, and a description thereof will be omitted.

Figure 16:
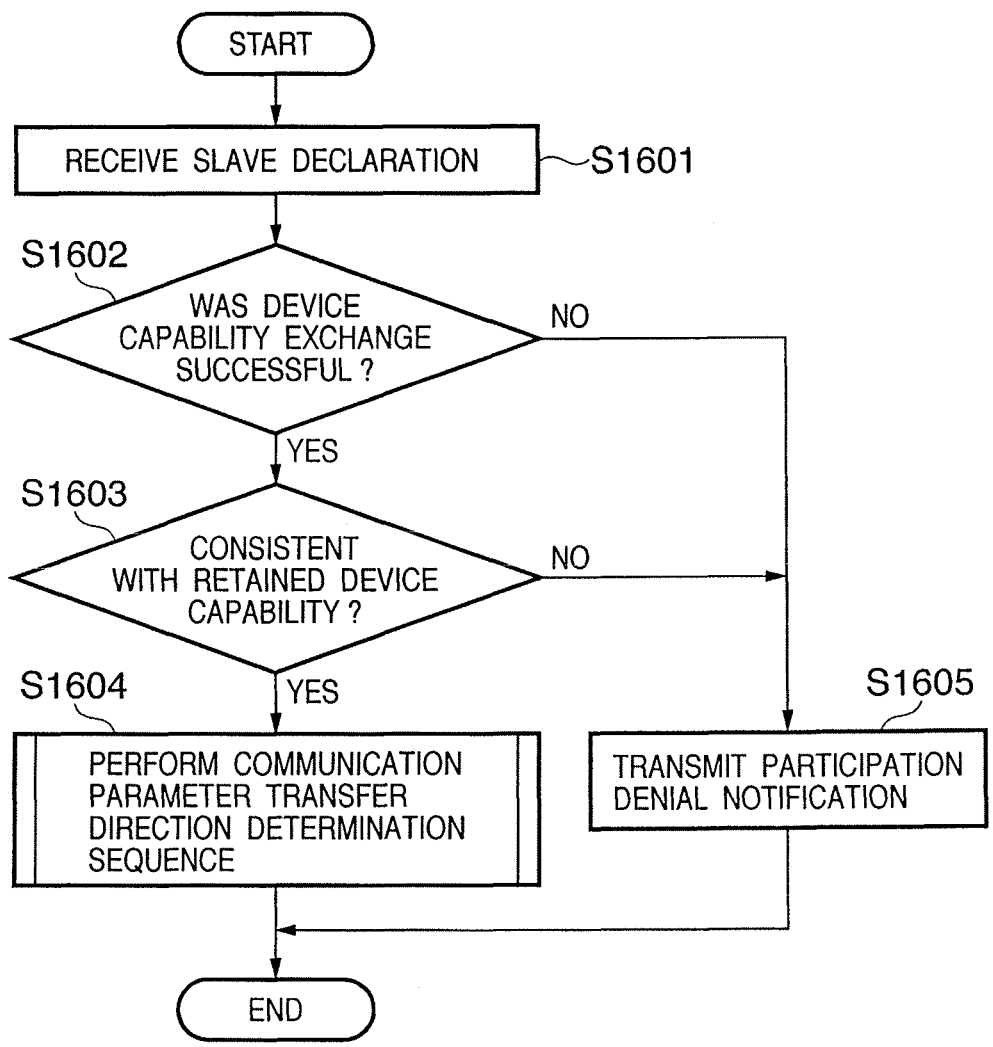
FIG. 16 is a flowchart showing processing of a master-side device having a communication parameter configuration control function, according to the fourth embodiment.

FIG. 16 is a flowchart showing processing at a master-side device having a communication parameter configuration control function, according to the fourth embodiment. The master-side device receives a slave declaration message from a slave-side device (S1601). After receiving the slave declaration message, the master-side device transmits a device capability transmission request to the slave-side device, and performs a device capability exchange by receiving a device capability response from the slave-side device (S1602).

Next, the master-side device determines whether the device capability exchange has been successful. If not (NO in S1602), the master-side device transmits at this point a participation denial notification message to the slave-side device (S1605).

On the one hand, if the device capability exchange has been successful (YES in S1602), the master-side device compares the device capability obtained from the slave-side device with the device capability retained by itself (S1603). At this point, if the device capabilities are inconsistent (NO in S1603), the master-side device transmits a participation denial notification message to the slave-side device (S1605) in the same way as with a device capability exchange failure.

On the other hand, if it is determined that the device capabilities are either consistent or sufficient (YES in S1603), the communication parameter transfer direction determination step 104 of the communication parameter configuration control function is performed (S1604).

Incidentally, while encryption methods or authentication methods were assumed to be the device capabilities according to the fourth embodiment, determination can also be performed based on other capabilities.

As seen, in the fourth embodiment, acceptance of participation to a communication parameter configuration network is controlled by determination based on device capabilities of slave devices as the participation state of communication devices participating in the network.

Fifth Embodiment

Next, a detailed description of a fifth embodiment according to the present invention will be provided with reference to the drawings. The fifth embodiment uses random numbers for the request signals and the response signals in the master device determination step 102, and encrypts the sequence from the device capability collection step and onwards using the random number values as elements thereof.

For the fifth embodiment, as shown in FIG. 6, processing for preventing participation to a network by an unexpected third party while two wireless communication devices perform communication parameter configuration will also be described.

Figure 17:
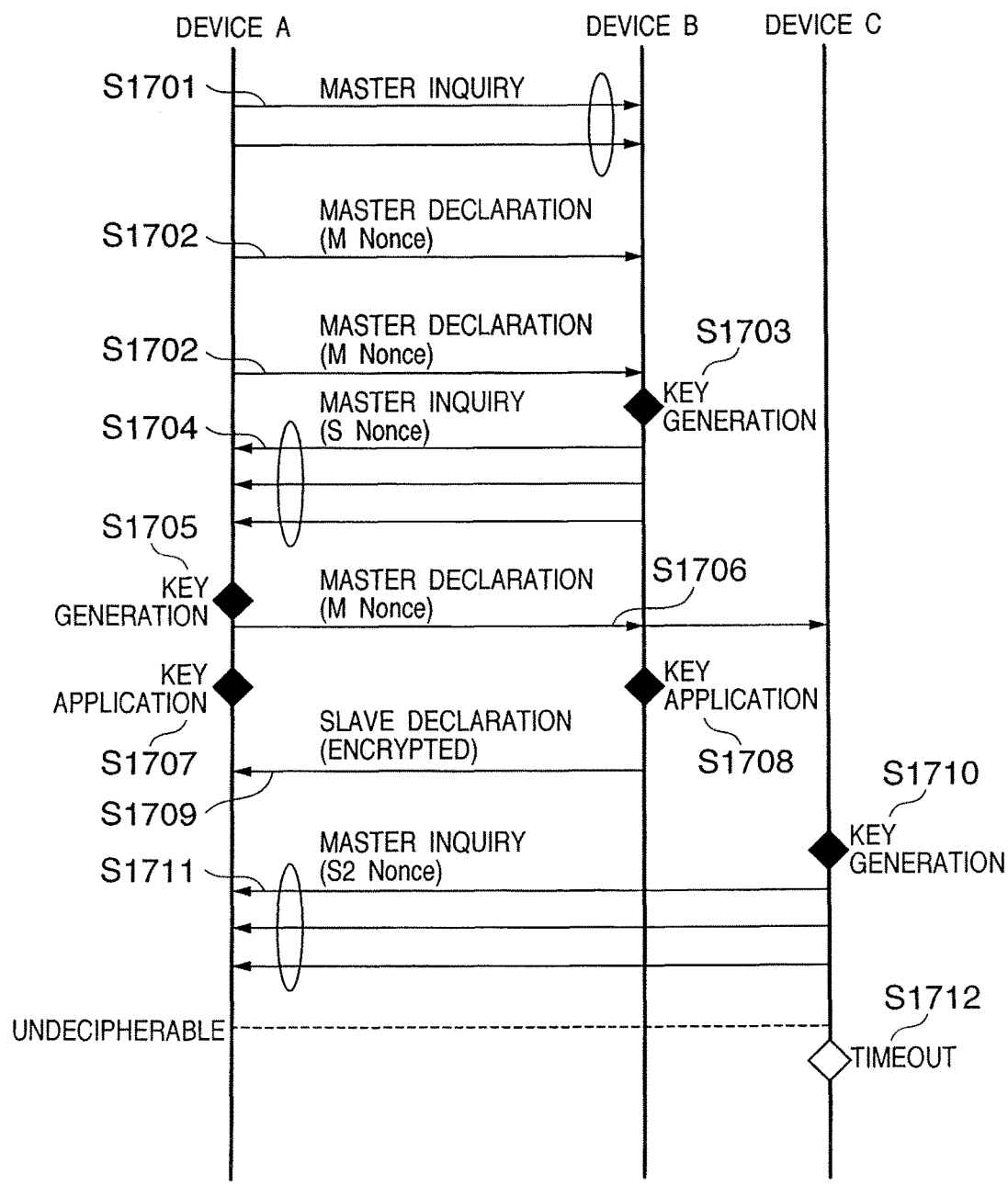
FIG. 17 is a diagram illustrating the sequence from a determination step for determining a master device having a communication parameter configuration control function to a device capability collection step, according to a fifth embodiment.

FIG. 17 is a diagram illustrating the sequence from a determination step for determining a master device having a communication parameter configuration control function to a device capability collection step, according to a fifth embodiment. In FIG. 17, it is assumed that the communication parameter configuration network formation step 101 has already been completed between the devices A and B, and that the device A is the IBSS creator, while devices B and C are joiners.

The device A transmits a master inquiry message (S1701) as a broadcast message. At this point, the master device determination step 102 has just commenced and a master device does not yet exist. Thus, a response to the master inquiry message (S1701) will not be transmitted.

Therefore, the device A configures itself as the master device, terminates transmission of the master inquiry message (S1701), and instead commences transmission of a master declaration message (S1702). A random number (M Nonce) generated by the master-side device is attached to the master declaration message (S1702).

When receiving a master declaration message (S1702) from the device A, the device B generates (S1703) a session key using the abovementioned random number (M Nonce), a random number (S Nonce) generated within the device B, and Seed that is stored in the device B. For Seed, it is assumed that a common value is stored in advance in devices having communication parameter configuration controlling functions. Next, after a lapse of a random interval, the device B transmits a master inquiry message (S1704) as a broadcast message. The random number (S Nonce) is attached to the master inquiry message (S1704).

After receiving the master inquiry message (S1704) from the device B, the device A generates a session key using the random number (M Nonce), the random number (S Nonce) attached to the master inquiry message, and Seed that is stored in the device A (S1705).

After generating the above-described session key, the device A transmits a master declaration message (S1706) to the device B in plaintext. The device A next performs encryption of transmitted data and decryption of received data using the generated session key (S1707).

On the other hand, when receiving the master declaration message (S1706) transmitted by the device A, the device B applies the generated session key for all subsequent communication (S1708). The device B encrypts a slave declaration message (S1709) with the session key, and transmits the message to the device A. All subsequent communication between the devices A and B will be encrypted.

Suppose a third terminal device C has appeared afterwards. In addition, assume that the device C has already intercepted the master declaration message (S1706) transmitted by the device A, and has generated a session key (1710) in the same manner as the device B.

The device C first transmits a master inquiry message (S1711) towards the device A. Meanwhile, since the device A has already established encryption with the device B, the device A is unable to decrypt the received master inquiry message (S1711) that was transmitted by the device C, and thus will not return a response.

Therefore, since the device C cannot receive a response to its master inquiry message (S1711), a timeout occurs (S1712). The device C terminates processing related to the communication parameter configuration network the moment the timeout occurs.

Following the above description on the sequence between the devices, processing performed by the master-side device and the slave-side device will now be described. First, the processing performed by the master-side device will be described using FIG. 18.

Figure 18:
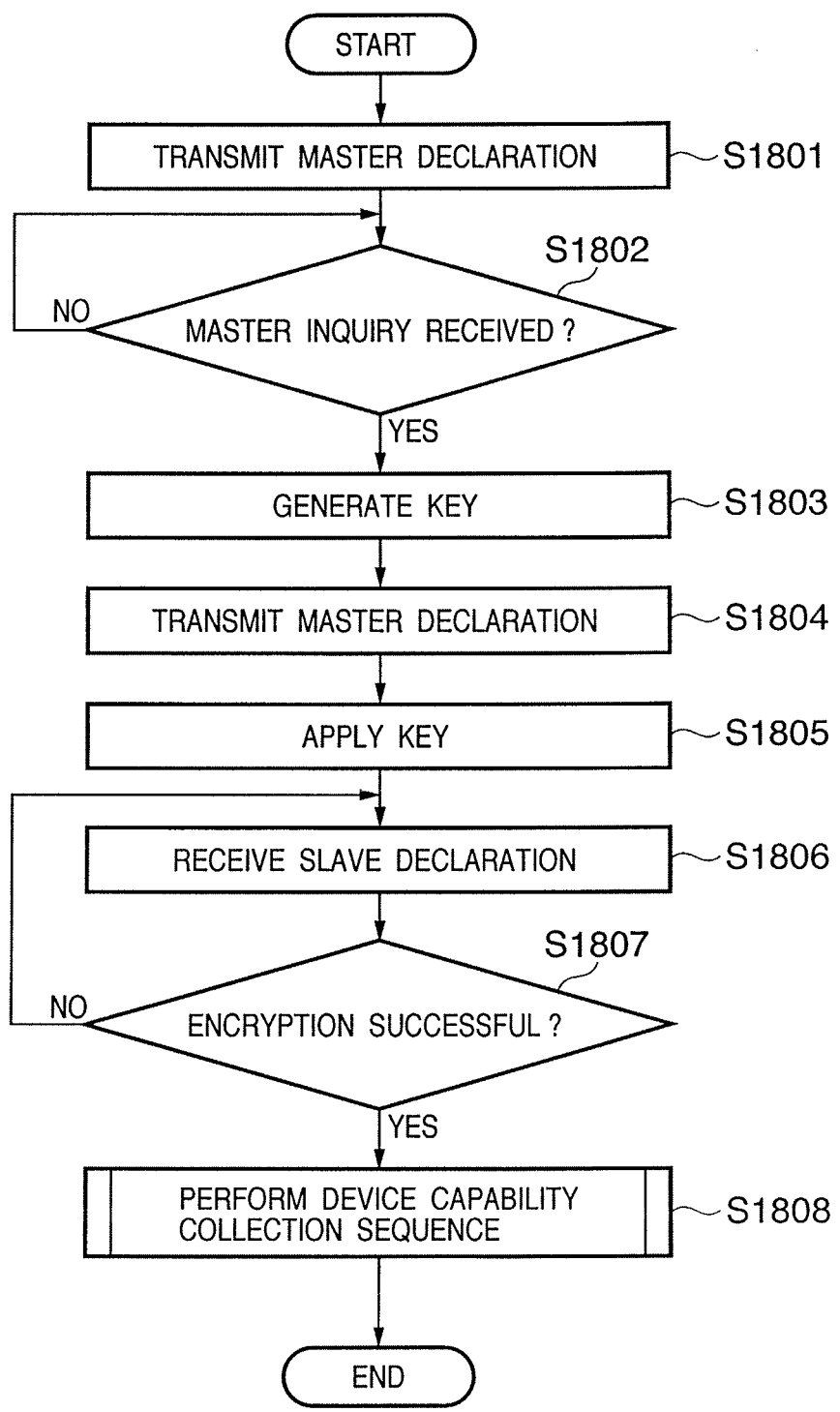
FIG. 18 is a flowchart showing processing of a master-side device having a communication parameter configuration control function, according to the fifth embodiment.

FIG. 18 is a flowchart showing processing of a master-side device having a communication parameter configuration control according to the fifth embodiment. The master device attaches a random number generated internally to a master declaration message and transmits the message (S1801). After transmission, the master device stands by for master inquiry messages from slave candidate devices (S1802). During standby for master inquiry messages, when a master inquiry message is not received, the master device repeats this standby processing.

Afterwards, when a master inquiry message is received from a slave device (YES in S1802), the master device generates a session key that is effective within the communication parameter configuration network (S1803). To be more specific, the device A generates the session key using the random number generated internally (M Nonce), the random number (S Nonce) generated within the slave-side device and attached to the master inquiry message, and Seed that is retained within the master device.

Next, the master device transmits a master declaration message to the slave device without performing encryption (S1804). After transmission of the master declaration message, the master device applies the generated session key (S1805), and stands by for a slave declaration message from the slave device. Upon receiving the slave declaration message (S1806), the master device performs decryption of the slave declaration message using the session key (S1807). When the decryption is failed (NO in S1807), the master device returns to slave declaration message standby processing again (S1806).

On the other hand, when the decryption of the slave declaration message is successful (YES in S1807), processing transits to the device capability collection step 103 (S1808), which is the next step of the communication parameter configuration control function.

Following the above description on the processing performed by the master-side device, the processing performed by the slave-side device will be described using FIG. 19.

Figure 19:
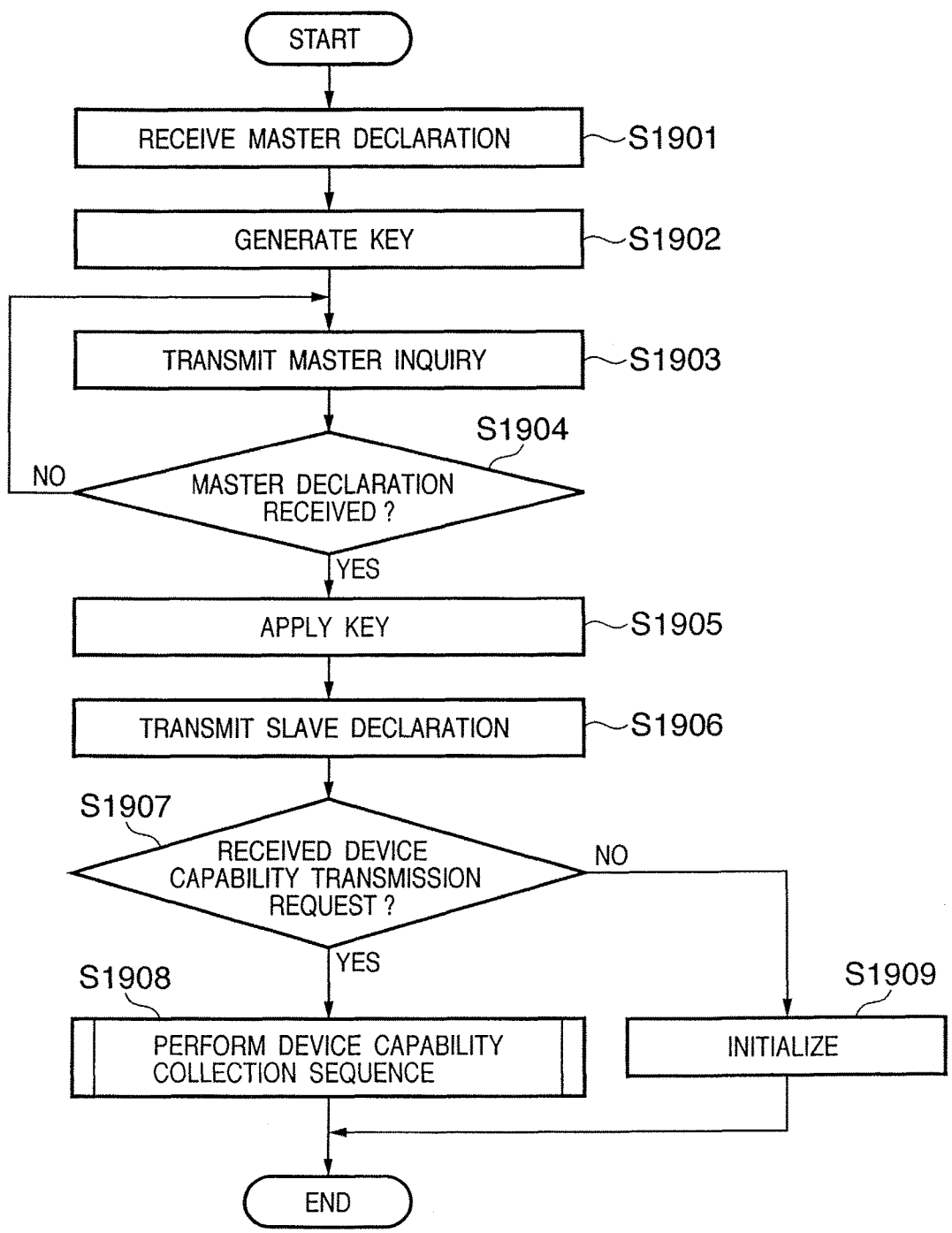
FIG. 19 is a flowchart showing processing of a slave-side device having a communication parameter configuration control function, according to the fifth embodiment.

FIG. 19 is a flowchart showing processing of a slave-side device having a communication parameter configuration control function, according to the fifth embodiment. First, when a master-side device already exists in the vicinity, a device having a communication parameter configuration control function receives a master declaration message (S1901). The master declaration message contains a master-side device random number (M Nonce). A session key to be used in the communication parameter configuration network is generated from the random number (M Nonce), a slave-side device random number (S Nonce) generated within the slave-side device and Seed (S1902).

After generating the session key, the slave-side device transmits a master inquiry as a broadcast transmission (S1903). Once the master inquiry message is transmitted, the slave-side device stands by for a master declaration message to be transmitted from the master-side device. Upon receiving the master declaration message from the master-side device (YES in S1904), the slave-side device compares the above-described random number (M Nonce) upon generation of the session key with the random number (M Nonce) contained within the master declaration message received at this point. When the random number (M Nonce) is identical, the generated session key is applied (S1905).

The slave-side device next transmits a slave declaration encrypted using the session key to the master-side device (S1906). If the slave declaration is successfully transmitted to the master-side device, the slave-side device stands by for a device capability transmission request to be transmitted from the master-side device (S1907). When a decipherable device capability transmission request is not received from the master-side (NO in S1907), the slave-side device terminates processing related to the communication parameter configuration network (S1909).

On the other hand, when a device capability transmission request is received from the master-side device (YES in S1907), the slave-side device performs the device capability collection step 103 (S1908), which is the next step in the communication parameter configuration controlling function.

According to the fifth embodiment, communication parameter configuration can be performed between the master device and the slave devices with an encryption processing that is stronger than is used in the first embodiment. As seen, in the fifth embodiment, acceptance of participation to a communication parameter configuration network is controlled by determining whether a communication device has already commenced encrypted communication with another communication device as the participation state of communication devices participating in the network.

The present invention may be applied to both systems comprising a plurality of devices (for example, a host computer, an interface device, a reader or a printer), or apparatuses composed of a single device (for example, a copying machine or facsimile machine).

It is obvious that the object of the present invention may also be achieved by supplying a storage media that stores a program code of a software capable of achieving the functions of the described embodiments to a system or an apparatus, and having a computer (CPU or MPU) of the system or apparatus read out and execute the program stored in the storage media.

In this case, the program codes themselves that are read out from the storage media achieve the functions of the above mentioned embodiments, while the storage media containing the program codes compose the present invention.

Storage devices to which the program codes are supplied may include, for instance, a floppy disk (registered trademark), a hard disk, an optical dick, a magneto-optical disk, a CD-ROM, a CD-R, a magnetic tape, a nonvolatile memory card, a ROM or the like.

In addition, it is obvious that the functions of the aforementioned embodiments can be achieved not only by executing program codes read out by a computer, but also through the processing performed by an OS (operating system) or the like, which is running on a computer, that performs a portion or all of the actual processing based on instructions from the program code.

Furthermore, it is obvious that the functions of the aforementioned embodiments can also be achieved by writing program codes read out by a computer into either a function enhancement board inserted into a computer or a memory built into a function enhancement unit connected to a computer, and having a CPU or the like built into the function enhancement board or the function enhancement unit perform a portion or all of the actual processing based on instructions from the program code.

According to the above description, the present invention is capable of strengthening countermeasure against spoofing by third parties by applying certain restrictions when establishing a communication parameter configuration network. In addition, the present invention is capable of reducing transmission of communication parameters to unnecessary devices, thereby reducing unnecessary information leakage.

In addition, a certain level of security may be ensured by encrypting communication performed in a communication parameter configuration network.

Furthermore, participation to the network by a third party can be denied while continuing already established wireless communication parameter configuration control functions performed between devices, thereby improving the operating efficiency of a user.

As shown, according to the present embodiments, responses against spoofing by third parties can be strengthened by applying certain restrictions when establishing a communication parameter configuration network. In addition, the present invention is capable of reducing transmittance of communication parameters to unnecessary devices, thereby reducing unnecessary information leakage.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-172968 filed on Jun. 13, 2005, which is hereby incorporated by reference herein in its entirety.

The invention claimed is:

1. A communication apparatus, comprising:
one or more computers for causing the communication apparatus to:
receive information of a value that is had by another communication apparatus;
compare the received value with a value that is had by the communication apparatus;
determine, based on a result of the comparison, whether the communication apparatus operates as a providing apparatus that provides a communication parameter used for wireless communication compliant with IEEE 802.11 series, or the other communication apparatus operates as the providing apparatus;
provide the communication parameter to the other communication apparatus in a case where it is determined based on the result of the comparison that the communication apparatus operates as the providing apparatus,
wherein the communication apparatus encrypts the communication parameter so as to provide the encrypted communication parameter to the other communication apparatus, in the case where it is determined that the communication apparatus operates as the providing apparatus, and
wherein the communication apparatus encrypts the communication parameter using an encryption key that is generated based on a random value generated by the communication apparatus and on a random number generated by the other communication apparatus; and
receive the communication parameter from the other communication apparatus in a case where it is determined based on the result of the comparison that the other communication apparatus operates as the providing apparatus,
wherein a number of apparatuses that are allowed to participate in a network, in which the communication apparatus is participating, is limited.

2. The communication apparatus according to claim 1, wherein the communication parameter includes a Service Set Identifier (SSID) and an encryption scheme used in wireless communication between the communication apparatus and the other communication apparatus.

3. The communication apparatus according to claim 1, further comprising a wired communication interface configured to perform wired communication.

4. The communication apparatus according to claim 1, wherein the one or more computers further causes the communication apparatus to detect the other communication apparatus by transmitting a probe request and receiving a probe response from the other communication apparatus.

5. The communication apparatus according to claim 4, wherein the one or more computers further causes the communication apparatus to transmit the probe request according to a user instruction.

6. The communication apparatus according to claim 5, wherein a time period from the user instruction to transmission of the probe request is randomly determined.

7. The communication apparatus according to claim 1, wherein the network is a network for communicating the communication parameter between the communication apparatus and the other communication apparatus.

8. The communication apparatus according to claim 1, wherein the value that is had by the communication apparatus and is used in the comparison is a value indicating a device capability of the communication apparatus, and
the value that is had by the other communication apparatus and is used in the comparison is a value indicating a device capability of the other communication apparatus.

9. A control method executed by a processor of a communication apparatus, the method comprising:
receiving information of a value that is had by another communication apparatus;
comparing the received value with a value that is had by the communication apparatus;
determining, based on a result of the comparison, whether the communication apparatus operates as a providing apparatus that provides a communication parameter used for wireless communication compliant with IEEE 802.11 series, or the other communication apparatus operates as the providing apparatus;
providing the communication parameter to the other communication apparatus in a case where it is determined based on the result of the comparison that the communication apparatus operates as the providing apparatus,
wherein the communication apparatus encrypts the communication parameter so as to provide the encrypted communication parameter to the other communication apparatus, in the case where it is determined that the communication apparatus operates as the providing apparatus, and
wherein the communication apparatus encrypts the communication parameter using an encryption key that is generated based on a random value generated by the communication apparatus and on a random number generated by the other communication apparatus; and
receiving the communication parameter from the other communication apparatus in a case where it is determined based on the result of the comparison that the other communication apparatus operates as the providing apparatus,
wherein a number of apparatuses that are allowed to participate in a network, in which the communication apparatus is participating, is limited.

10. A non-transitory computer-readable storage medium storing a computer program for causing a computer of a communication apparatus to execute:
receiving information of a value that is had by another communication apparatus;
comparing the received value with a value that is had by the communication apparatus;
determining, based on a result of the comparison, whether the communication apparatus operates as a providing apparatus that provides a communication parameter used for wireless communication compliant with IEEE 802.11 series, or the other communication apparatus operates as the providing apparatus;

providing the communication parameter to the other communication apparatus in a case where it is determined based on the result of the comparison that the communication apparatus operates as the providing apparatus, wherein the communication apparatus encrypts the communication parameter so as to provide the encrypted communication parameter to the other communication apparatus, in the case where it is determined that the communication apparatus operates as the providing apparatus, and wherein the communication apparatus encrypts the communication parameter using an encryption key that is generated based on a random value generated by the communication apparatus and on a random number generated by the other communication apparatus; and receiving the communication parameter from the other communication apparatus in a case where it is determined based on the result of the comparison that the other communication apparatus operates as the providing apparatus, wherein a number of apparatuses that are allowed to participate in a network, in which the communication apparatus is participating, is limited.

* * * * *